US010291366B2

(12) United States Patent
Nigam et al.

(10) Patent No.: US 10,291,366 B2
(45) Date of Patent: *May 14, 2019

(54) METHOD, USER EQUIPMENT AND BASE STATION FOR CONTROLLING DISCONTINUOUS RECEPTION (DRX) IN WIRELESS COMMUNICATION SYSTEM

(71) Applicant: Samsung Electronics Co., Ltd., Gyeonggi-do (KR)

(72) Inventors: Anshuman Nigam, Karnataka (IN); Jungsoo Jung, Gyeonggi-do (KR); Sunheui Ryoo, Gyeonggi-do (KR); Jungmin Moon, Gyeonggi-do (KR); Sungjin Lee, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 0 days.

This patent is subject to a terminal disclaimer.

(21) Appl. No.: 15/601,264

(22) Filed: May 22, 2017

(65) Prior Publication Data

US 2017/0264400 A1 Sep. 14, 2017

Related U.S. Application Data

(63) Continuation of application No. 14/706,503, filed on May 7, 2015, now Pat. No. 9,660,773.

(30) Foreign Application Priority Data

May 7, 2014 (KR) .................. 10-2014-0054325

(51) Int. Cl.
*H04L 5/00* (2006.01)
*H04W 52/02* (2009.01)
(Continued)

(52) U.S. Cl.
CPC .............. *H04L 5/00* (2013.01); *H04L 5/0035* (2013.01); *H04W 52/0209* (2013.01);
(Continued)

(58) Field of Classification Search
CPC ........ H04L 5/00; H04L 5/0035; H04W 76/28; H04W 52/0225; H04W 52/0216;
(Continued)

(56) References Cited

U.S. PATENT DOCUMENTS 8,451,798 B2 5/2013 Chen
2009/0239568 A1* 9/2009 Bertrand ........... H04W 52/0225
455/522
(Continued)

FOREIGN PATENT DOCUMENTS

WO WO 2008/094681 8/2008
WO WO 2011/102644 8/2011
(Continued)

OTHER PUBLICATIONS

CMCC, "Procedures for Efficient Discovery of Small Cells", R1-132547, 3GPP TSG-RAN WG1 #73, May 20-24, 2013, 5 pages.
(Continued)

*Primary Examiner* — Walli Z Butt
(74) *Attorney, Agent, or Firm* — The Farrell Law Firm, P.C.

(57) ABSTRACT

A method is provided for controlling in a wireless communication system. A method includes receiving, from a second base station or a core network, information of data to be transmitted to a terminal through the second base station; determining a monitoring condition for the terminal to monitor the second base station based on the information of the data; and transmitting, to the terminal, a monitoring request message requesting the terminal to monitor the second base station based on the monitoring condition.

20 Claims, 19 Drawing Sheets

(51) Int. Cl.
 *H04W 72/04* (2009.01)
 *H04W 76/28* (2018.01)
 *H04W 76/15* (2018.01)
(52) U.S. Cl.
 CPC ... *H04W 52/0216* (2013.01); *H04W 52/0225* (2013.01); *H04W 72/0426* (2013.01); *H04W 76/15* (2018.02); *H04W 76/28* (2018.02); *Y02D 70/1262* (2018.01); *Y02D 70/1264* (2018.01); *Y02D 70/21* (2018.01); *Y02D 70/24* (2018.01)
(58) Field of Classification Search
 CPC .......... H04W 52/0209; H04W 72/0426; Y02D 70/24; Y02D 70/1264; Y02D 70/21; Y02D 70/1262
 See application file for complete search history.

(56) References Cited

U.S. PATENT DOCUMENTS

| | | |
|---|---|---|
| 2011/0128925 A1 | 6/2011 | Lindoff et al. |
| 2011/0294491 A1 | 12/2011 | Fong et al. |
| 2012/0176950 A1 | 7/2012 | Zhang et al. |
| 2014/0335858 A1* | 11/2014 | Lee ................... H04W 52/0206 455/434 |
| 2014/0335882 A1* | 11/2014 | Lee ....................... H04W 76/15 455/452.2 |
| 2015/0031368 A1 | 1/2015 | Zhong |
| 2015/0365894 A1* | 12/2015 | Bai ....................... H04L 1/1854 370/311 |
| 2016/0183325 A1* | 6/2016 | Harada ................. H04W 36/00 370/328 |
| 2016/0249405 A1 | 8/2016 | Koc |

FOREIGN PATENT DOCUMENTS

| | | |
|---|---|---|
| WO | WO 2013/140243 | 9/2013 |
| WO | WO 2015/063591 | 5/2015 |

OTHER PUBLICATIONS

Huawei, HiSilicon, "DRX Coordination in Dual Connectivity", R2-140080, 3GPP TSG-RAN WG2 Meeting #85, Feb. 10-14, 2014, 3 pages.

International Search Report dated Aug. 28, 2015 issued in counterpart application No. PCT/KR2015/004555, 5 pages.

* cited by examiner

US 10,291,366 B2

METHOD, USER EQUIPMENT AND BASE STATION FOR CONTROLLING DISCONTINUOUS RECEPTION (DRX) IN WIRELESS COMMUNICATION SYSTEM

PRIORITY

This application is a continuation of U.S. application Ser. No. 14/706,503, which was filed in the U.S. Patent and Trademark Office on May 7, 2015, and claims priority under 35 U.S.C. § 119(a) to Korean Patent Application No. 10-2014-0054325, which was filed in the Korean Intellectual Property Office on May 7, 2014, the entire disclosure of each of which is incorporated herein by reference.

BACKGROUND OF THE INVENTION

1. Field of the invention

The present invention relates generally to wireless communication, and more particularly, to a method, a user equipment (UE), and an evolved Node B (eNB) for controlling discontinuous reception (DRX) in a wireless communication system.

2. Description of the Related Art

To meet the ever increasing demand for wireless traffic data, efforts are currently being made to develop an improved 5th Generation (5G) or pre-5G communication system, which may also be referred to as a "Beyond 4G Network" or a "Post LTE System".

The 5G communication system is intended to use higher frequency (mmWave) bands, e.g., 60 GHz bands, in order to accomplish higher data rates. Further, to decrease propagation loss of the radio waves and increase transmission distances, beamforming, massive multiple-input multiple-output (MIMO), full dimensional MIMO (FD-MIMO), array antenna, analog beam forming, large scale antenna techniques are also being discussed in for the 5G communication systems.

Additionally, in 5G communication systems, development is under way for system network improvements based on advanced small cells, cloud radio access networks (RANs), ultra-dense networks, device-to-device (D2D) communication, wireless backhaul, moving network, cooperative communication, coordinated multi-point (CoMP), reception-end interference cancellation, etc.

Further, for the 5G communication systems, advanced access technologies, such as hybrid frequency shift keying (FSK) and quadrature amplitude modulation (QAM) (FQAM) and sliding window superposition coding (SWSC) as an advanced coding modulation (ACM), and filter bank multi carrier (FBMC), non-orthogonal multiple access (NOMA), and sparse code multiple access (SCMA) are also being developed.

Dual connectivity, which refers to a terminal that is connected to two eNBs to receive service, is also actively being discussed for the 5G communication systems. For example, the dual connectivity includes a terminal being connected to a macro eNB and a small (pico) eNB, which have different functions and provide different services. However, a procedure for a hand over method of a terminal utilizing the dual connectivity has not yet been defined.

SUMMARY OF THE INVENTION

Accordingly, the present invention is designed to address at least the problems and/or disadvantages described above and to provide at least the advantages described below.

An aspect of the present invention is to provide a method, a UE, and an eNB, which efficiently control DRX, while reducing power consumption of the UE, when the UE is connected to a plurality of cells in different bands.

In accordance with an aspect of the present invention, a method by a first base station in a wireless communication system is provided. The method includes receiving, from a second base station or a core network, information of data to be transmitted to a terminal through the second base station; determining a monitoring condition for the terminal to monitor the second base station based on the information of the data; and transmitting, to the terminal, a monitoring request message requesting the terminal to monitor the second base station based on the monitoring condition.

In accordance with another aspect of the present invention, a method by a terminal in a wireless communication system is provided. The method includes receiving, from a first base station, a monitoring request message requesting the terminal to monitor a second base station, the monitoring request message including a monitoring condition for the terminal to monitor the second base station; and monitoring the second base station based on the monitoring condition.

In accordance with another aspect of the present invention, a method by a first base station in a wireless communication system is provided. The method includes determining a discontinuous reception configuration of the first base station; receiving, from a second base station, information of monitoring condition for a terminal to monitor the first base station, the monitoring condition being determined based on information of data to be transmitted to the terminal through the first base station; and transmitting, to the terminal, the data based on the monitoring condition and the discontinuous reception configuration.

In accordance with another aspect of the present invention, a base station in a wireless communication system is provided. The base station includes a transceiver; and a controller configured to control the transceiver to receive, from another base station or a core network, information of data to be transmitted to a terminal through the another base station, determine a monitoring condition for the terminal to monitor the another base station based on the information of data, and control the transceiver to transmit, to the terminal, a monitoring request message requesting the terminal to monitor the another base station based on the monitoring condition.

In accordance with another aspect of the present invention, a terminal in a wireless communication system is provided. The terminal includes a transceiver; and a controller configured to control the transceiver to receive, from a first base station, a monitoring request message requesting the terminal to monitor a second base station, the monitoring request message including a monitoring condition for the terminal to monitor the second base station, and monitor the second base station based on the monitoring condition.

In accordance with another aspect of the present invention, a base station in a wireless communication system is provided. The base station includes a transceiver; and a controller configured to determine a discontinuous reception configuration of the first base station, control the transceiver to receive, from a another base station, information of monitoring condition for a terminal to monitor the first base station, the monitoring condition being determined based on information of data to be transmitted to the terminal through the base station, and control the transceiver to transmit, to the terminal, the data based on the monitoring condition and the discontinuous reception configuration.

BRIEF DESCRIPTION OF THE DRAWINGS

The above and other aspects, features, and advantages of certain embodiments of the present invention will be more apparent from the following detailed description in conjunction with the accompanying drawings, in which.

DETAILED DESCRIPTION OF EMBODIMENTS OF THE INVENTION

Figure 1:
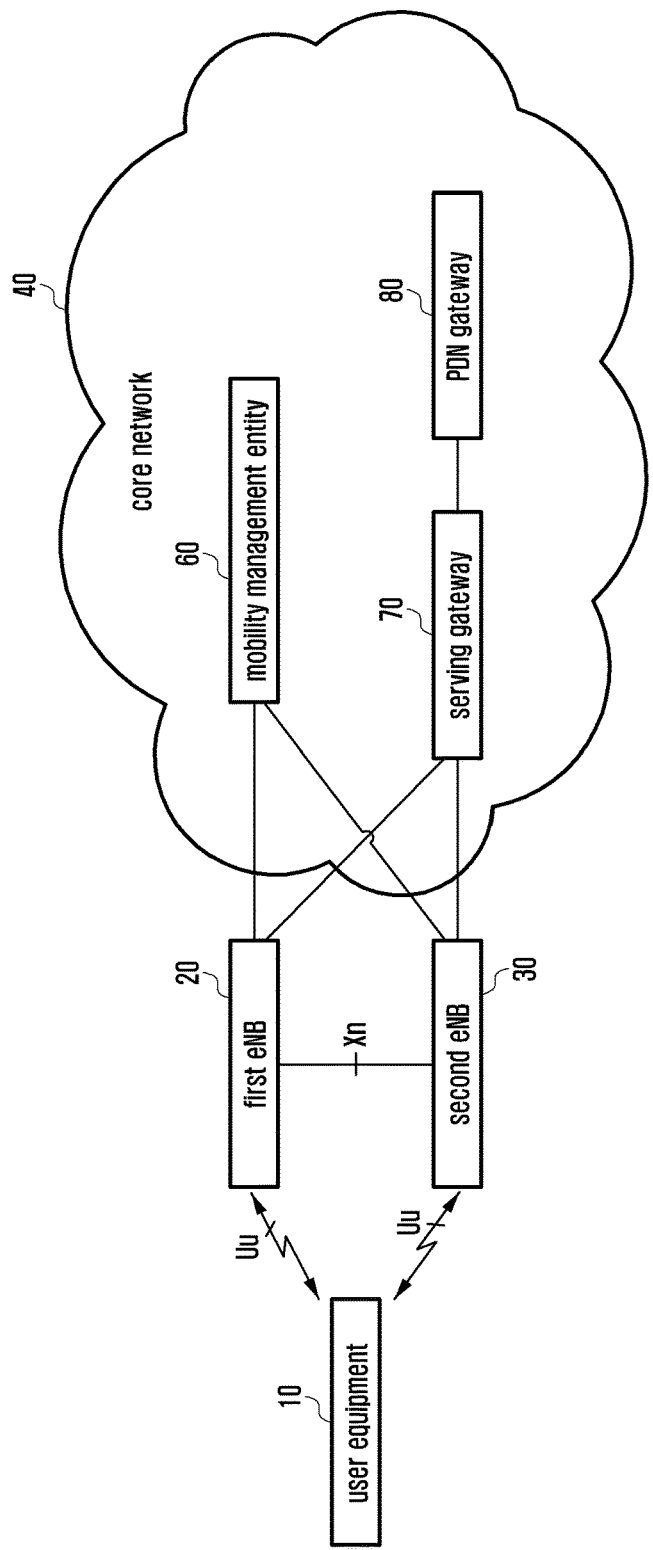
FIG. 1 illustrates a mobile communication system that supports dual connectivity according to an embodiment of the present invention.

Hereinafter, various embodiments of the present invention will be described with reference to the accompanying drawings. It is noted that, where possible, the same reference numerals are designated to the same components in the accompanying drawings. Further, a detailed description of a known function and configuration, which may obscure the subject matter of the present invention, will be omitted.

The various embodiments of the present invention described herein and illustrated in the drawings are only particular examples for describing technical matters of the present invention and assist in the understanding of the present invention. Accordingly, and the described embodiments are not intended to limit the scope of the present invention. It is apparent to those skilled in the art that other modified examples can be implemented, based on the technical idea of the present invention, in addition to the embodiments described herein.

FIG. 1 illustrates a mobile communication system that supports dual connectivity according to an embodiment of the present invention.

Referring to FIG. 1, the mobile communication system includes a UE 10, a first eNB 20, a second eNB 30, and a core network 40. For example, the mobile communication system may be a multiple access system that provides content, such as voice, data, video, messaging, broadcasting, etc., to a plurality of wireless users.

For example, the mobile communication system may be a Long Term Evolution (LTE) or advanced Evolved Universal Terrestrial Radio Access (E-UTRA) (or LTE-advanced (LTE-A)) system, which supports a carrier aggregation (CA). Basically, the mobile communication system may include other communication systems having a similar technological background and channel type and modifications of such communication systems, without significantly departing from the scope of the present invention, as could be achieved by a person having ordinary skill in the art of the present invention. For example, the mobile communication system may be a multicarrier high speed packet access (HSPA) system, which supports CA.

The UE 10 may be a terminal, a mobile station, a fixed or mobile subscriber station, a pager, a cellular phone, a personal portable terminal (PDA), a smart phone, a laptop, a netbook, a personal computer, a wireless sensor, a consumer electronic device, etc.

The first eNB 20 and the second eNB 30 may be any type of device capable of wirelessly interfacing with the UE 10 and providing access to the core network 40. For example, the first eNB 20 and the second eNB 30 may each be a base transceiver station (BTS), a Node B, an eNode B, a home node B, a home eNodeB, a site controller, an access point (AP), a wireless router, etc.

Although each of the first eNB 20 and the second eNB 30 are illustrated as a single element, the first eNB 20 and the second eNB 30 may include any number of interconnected eNBs and/or network elements.

The first eNB 20 and the second eNB 30 may be a part of a RAN including other eNBs, such as a base station controller (BSC), a radio network controller (RNC), a relay node, etc., or a network element. The first eNB 20 and the second eNB 30 may be configured to transmit a wireless signal in a specific geographical area, which is commonly referred to as a cell.

The first eNB 20 and the second eNB 30 communicate with the UE 10 through a wireless interface, which may be any usable wireless communication link, e.g., a radio frequency (RF) link, a microwave link, an infrared (IR) link, an ultraviolet (UV) link, a visible light link, etc. The wireless interface may be established using any proper radio access technology (RAT).

Further, the first eNB 20 and the second eNB 30 may implement a wireless technology, such as E-UTRA, which may establish a wireless interface 116 using LTE or LTE-A.

The core network 40 includes a mobility management entity (MME) 60, a serving gateway 70, and a packet data network (PDN) gateway 80. For example, the core network 40 may provide call controls, billing services, mobile location based services, pre-paid calls, Internet access, and/or video distribution, or may perform a high level security function.

The MME 60 connects to the first eNB 20 and the second eNB 30 through an S1 interface, to act as a control node. For example, the MME 60 may perform user authentication of the UE 10, bearer activation/deactivation, a selection of a specific serving gateway during an initial attachment of the UE 10. The MME 60 may include a control plane function for switching between different RANs.

The serving gateway 70 connects to the first eNB 20 and the second eNB 30 through an S1 interface, to rout and forward user data packets to/from the UE 10. The serving gateway 70 may also perform other functions, such as anchoring a user plane during an eNodeB handover, paging triggering, when downlink data is sent to the UE 10, management and storage of a context of the UE 10, etc.

The serving gateway 70 connects to the PDN gateway 80, which provides the UE 10 with access to a packet exchange network, such as the Internet, such that communication between the UE 10 and an IP function device is possible.

The user device 10 may be simultaneously connected to the first eNB 20 and the second eNB 30. In this event, the first eNB 20 may be designated as a master eNB (MeNB) and the second eNB 30 may be designated as a slave eNB (SeNB). The MeNB 20 and the SeNB 30 provide a service to the UE 10. Both the MeNB 20 and the SeNB 30 may provide a radio resource control function to the UE 10, or either one of the MeNB 20 or the SeNB 30 may provide a radio resource control function to the UE 10.

In dual connectivity, the UE 10 may simultaneously be connected to the MeNB 20, as a macro cell, and to the SeNB 30, a small cell. While the small cell provides a data boost, the macro cell usually manages an access control and mobility. The macro cell and the small cell use different bands. In some embodiments, a small cell use a higher band such as 3.5 GHz and a macro cell use a low band, which provides a wider range, such as 900 MHz. Consequently, a receiver for the macro cell and a receiver for the small cell are different. Hereinafter, the MeNB 20 is used interchangeably with the macro cell and the SeNB 30 is used interchangeably with the small cell.

Figure 2:
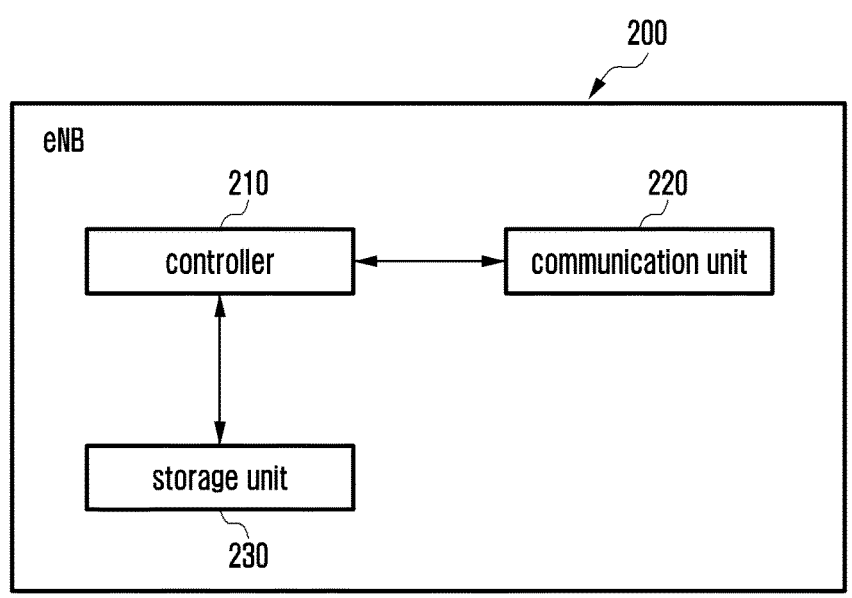
FIG. 2 illustrates an eNB according to an embodiment of the present invention.

FIG. 2 illustrates an eNB according to an embodiment of the present invention.

Referring to FIG. 2, an eNB 200 includes a controller 210, a communication unit 220, and a storage unit 230. For example, the first eNB 20 or the second eNB 30 illustrated in FIG. 1 may be configured using the eNB 200.

The controller 210 executes commands and performs operations related to the eNB 200. For example, using a command, the controller 210 may control the input and output between components of the eNB 200, and the reception and processing of data. The controller 210 may also execute commands related to information received from an input device. Further, the controller 210 may control a process of data received from the communication unit 220, control a process for generating a control signal, and control the communication unit 220 to transmit data and the control signal to be transmitted.

The controller 210 may execute a program code with an operating system of the eNB 200 and perform operations for generating and using data. The controller 210 may control operations of the communication unit 210 and the storage unit 230. The operating system, a different computer code, and data may exist within the storage unit 230, which is connected to the controller 140.

The controller 210 may be implemented on a single chip, a plurality of chips, or a plurality of electric components. For example, the controller 210 may include multiple architectures including an exclusive or embedded processor, a single purpose processor, a controller, an application specific integrated circuit (ASIC), etc.

The communication unit 220 transmits and receives signals including data and packets with a UE, another eNB, and a core network.

Figure 3:
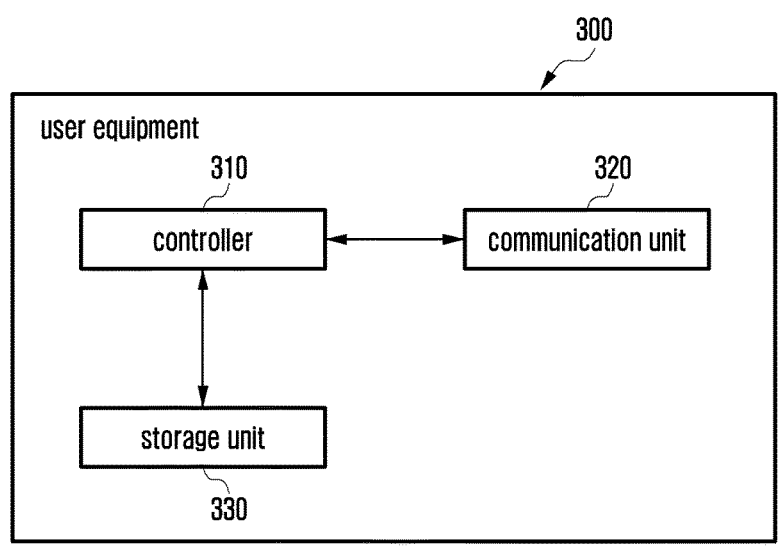
FIG. 3 illustrates a UE according to an embodiment of the present invention.

FIG. 3 illustrates a UE according to an embodiment of the present invention.

Referring to FIG. 3, a UE 300 may include a controller 310, a communication unit 320, and a storage unit 330. For example, the UE 10 illustrated in FIG. 1 may be configured as the UE 300.

The controller 310 executes commands and performs operations related to the UE 300. For example, using a command, the controller 310 may control the input and output between components of the UE 300, and the reception and processing of data. The controller 310 may execute a command related to information received from an input device. Further, the controller 310 may control a processing of data received from the communication unit 320, control a process for generating a control signal, and control the communication unit 320 to transmit data and the control signal The controller 310 may execute a program code with an operating system of the UE 300 and perform operations for generating and using data. The controller 310 may control operations of the communication unit 320 and the storage unit 330. The operating system, a different computer code, and data may exist within the storage unit 330, which is connected to the controller 310.

The controller 310 may be implemented on a single chip, a plurality of chips, or a plurality of electric components. For example, the controller 310 may include multiple architectures including an exclusive or embedded processor, a single purpose processor, a controller, an ASIC, etc.

The controller 310 may recognize a user action and control the UE 300, based on the recognized user action. For example, the user action may include a selection of a physical button of a reception device, an execution of a predetermined gesture, a selection of a soft button on a touch screen display surface, an execution of a predetermined gesture recognized from an image photographed by a photographing apparatus, or an execution of predetermined vocalization recognized by a voice recognition. A gesture may include a touch gesture and a space gesture.

The communication unit 320 transmits and receives signals, which include data and packets, with an eNB and a core network.

Figure 4:
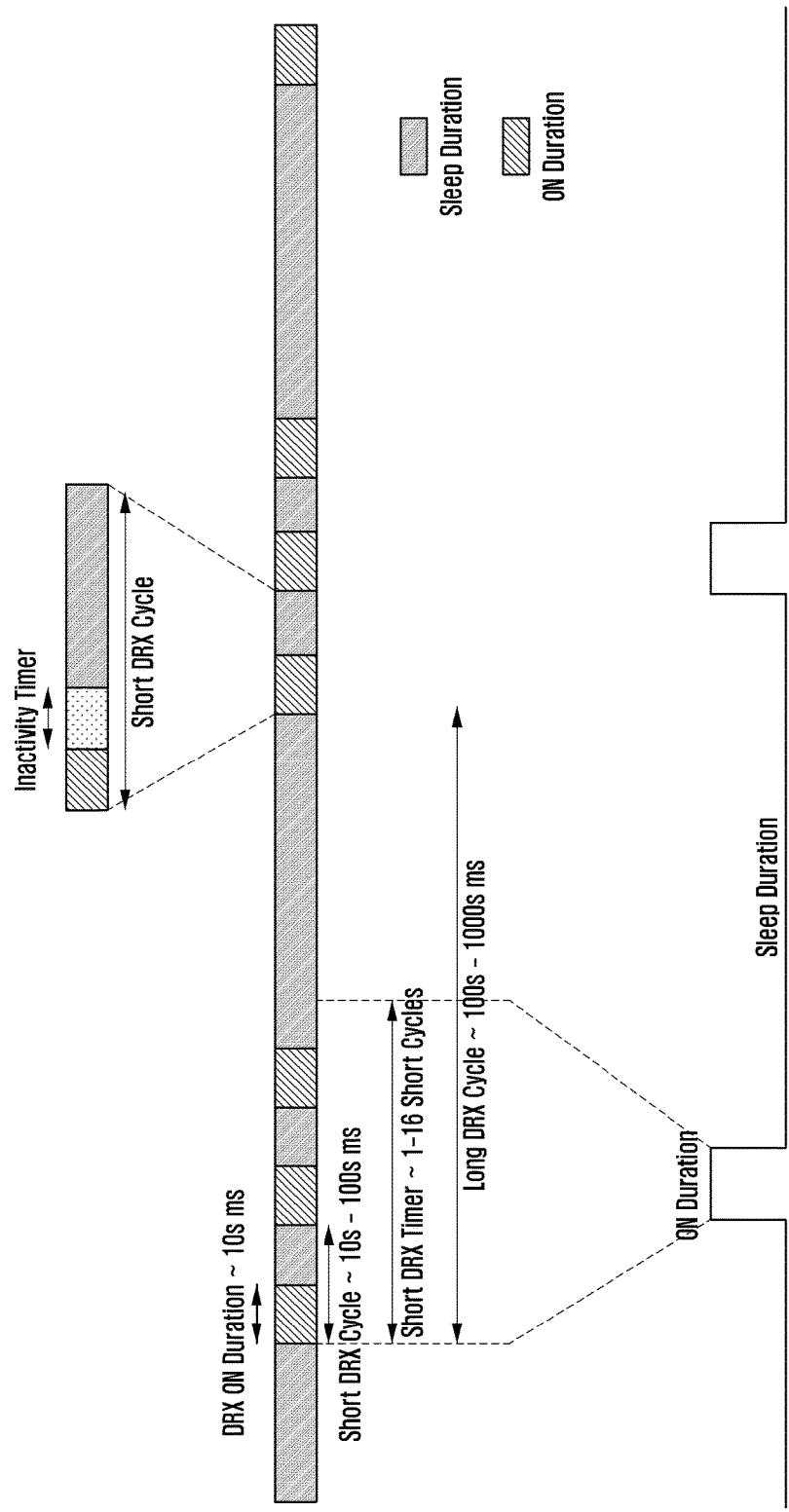
FIG. 4 illustrates concepts of DRX according to an embodiment of the present invention.

FIG. 4 illustrates concepts of DRX according to an embodiment of the present invention.

Referring to FIG. 4, in a mobile communication system, an eNB configures a DRX function for a UE through a radio resource control (RRC) protocol so that the UE may monitor an activation or operation of a physical downlink control channel (PDCCH). When the DRX is not configured in an RRC connection state, the UE continuously monitors the PDCCH. However, when the DRX is configured in an RRC connection state, the UE may discontinuously monitor the PDCCH, which may reduce power consumption of the UE.

A parameter related to a timer for configuring a DRX operation by the RRC may include an activity time parameter, a DRX inactivity timer, a DRX retransmission timer, which configures one DRX retransmission timer to each downlink hybrid automatic retransmit request (HARQ) process, except for a broadcasting control channel reception exclusive downlink HARQ process, a long DRX cycle, a DRX start shift value, etc. The parameter related to the timer for configuring the DRX operation may further include a short DRX cycle timer and a short DRX cycle. An HARQ round trip timer may further be configured in each downlink HARQ process, except for the broadcasting control channel reception exclusive downlink HARQ process.

In order to describe the DRX operation of the UE, a concept of a PDCCH sub-frame may be introduced in the mobile communication system. For the UE, which is operated in a frequency division duplex (FDD) mode, the PDCCH sub-frame may represent any sub-frame, and for the UE, which is operated in a time division duplex (TDD) mode, the PDCCH sub-frame may indicate only a special sub-frame including a downlink sub-frame and a downlink pilot time slot (DwPTS).

An activity duration (i.e., an on duration) indicates a time for which the UE monitors a PDCCH in the PDCCH sub-frame.

In a MAC contention resolution timer, the UE should monitor the number of continuous PDCCH sub-frames of the PDCCH, after transmitting a Message 3 (Msg3) of a random access process.

The DRX cycle indicates periodic repetition accompanying an available sleep duration of an interval, which is involved in the activity duration.

A DRX inactivity timer successfully decodes an initial uplink or downlink user data transmission of the UE, which is indicated by the PDCCH, and then defines the number of the PDCCH sub-frames. Because, when some data has been transmitted, data traffic is usually configured by an Internet type of data having a characteristic in that larger data will be transmitted, a DRX mechanism may be designed to use the characteristic by using the DRX inactivity timer. Herein, the DRX inactivity timer is to be reset when a data packet has been received. When the data packet has not been received within a DRX inactivity timer duration, the UE transitions to a sleep state.

In the DRX retransmission timer, the UE defines the number of maximum continuous PDCCH sub-frames, when waiting for a downlink retransmission.

In the short DRX cycle timer, the UE defines the number of continuous sub-frames according to the short DRX cycle. In data reception, the DRX mechanism uses the short DRX cycle to avoid a long latency. The short DRX cycle operation is similar to a long DRX cycle, but has a shorter DRX activity duration (DRX on duration) and an inactivity duration (sleep duration).

In the HARQ round trip timer, the UE defines the number of minimum sub-frames before waiting for the downlink HARQ retransmission.

An activity time timer (i.e., on duration timer) defines the number of continuous PDCCH sub-frames when the DRX cycle starts.

Herein, a DRX configuration includes a timer for configuring the DRX operation and a parameter related to the DRX configuration. That is, the DRX configuration may include at least one of a DRX inactivity timer, a DRX retransmission timer for configuring one DRX retransmission timer to each downlink HARQ process, except for a broadcasting control channel reception exclusive downlink HARQ process, a long DRX cycle, a DRX start shift value, a short DRX cycle timer, a short DRX cycle, and an HARQ round trip timer configured in each downlink HARQ process, except for the broadcasting control channel reception exclusive downlink HARQ process.

Figure 5:
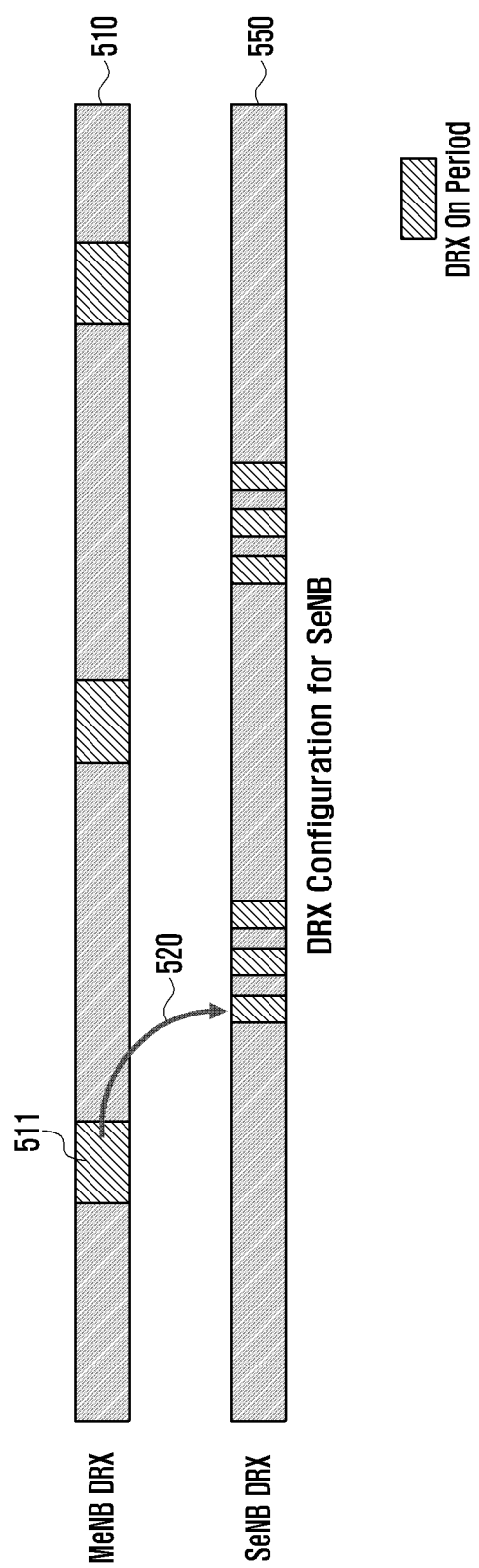
FIG. 5 illustrates a DRX configuration and operation according to an embodiment of the present invention.

FIG. 5 illustrates a DRX configuration and operation according to an embodiment of the present invention.

Referring to FIG. 5, an MeNB notifies a UE to monitor a small cell, i.e., an SeNB, in an approaching DRX activity period (i.e., an on period). The UE does not monitor the SeNB by default. DRX cycles of the MeNB and SeNB may individually be configured or may be configured together with a level of an adjustment between the MeNB and the SeNB. A long DRX cycle between the MeNB and the SeNB may be adjusted to match one long DRX cycle to the other one or to adjust one long DRX cycle be a multiple of the other. In order to consider a backhaul communication delay between eNBs, an offset between activity durations may be configured between the activity durations.

In FIG. 5, a time chart 510 indicates a DRX configuration of the MeNB and a time chart 550 indicates a DRX configuration of the SeNB. A configuration for a long DRX cycle is observed in the time chart 510, while a configuration of a long DRX cycle is not observed in the time chart 550. That is, for only the MeNB, the long DRX cycle may be configured. The MeNB 110 triggers the UE to monitor the SeNB in a DRX activity time 511. Specifically, the MeNB transmits an indication 520 to the UE, indicating that the UE is to monitor the SeNB. In the DRX configuration 510 and the DRX configuration 550, the short DRX cycle, the activity time, and the DRX inactivity timer are represented independently from each other. That is, the MeNB and SeNB depend on an independent short DRX cycle, activity time, and DRX inactivity timer.

The scheme, as illustrated in FIG. 5, may be referred to as "an SeNB monitoring controlled by an MeNB (MeNB controlled SeNB monitoring)".

In a first procedure of the scheme, the DRX configuration may be adjusted between eNBs. For example, the MeNB may transmit its own DRX configuration to the SeNB through a backhaul (e.g., an X2: interface between eNBs defined in a LTE standard document). The SeNB may select the DRX configuration based on the DRX configuration of the received MeNB. For example, the SeNB may select a long DRX cycle, which is identical to that of the MeNB, but the long DRX cycle, which is identical to that of the MeNB together with a start offset related to the long DRX cycle for considering an X2 delay.

Figure 6:
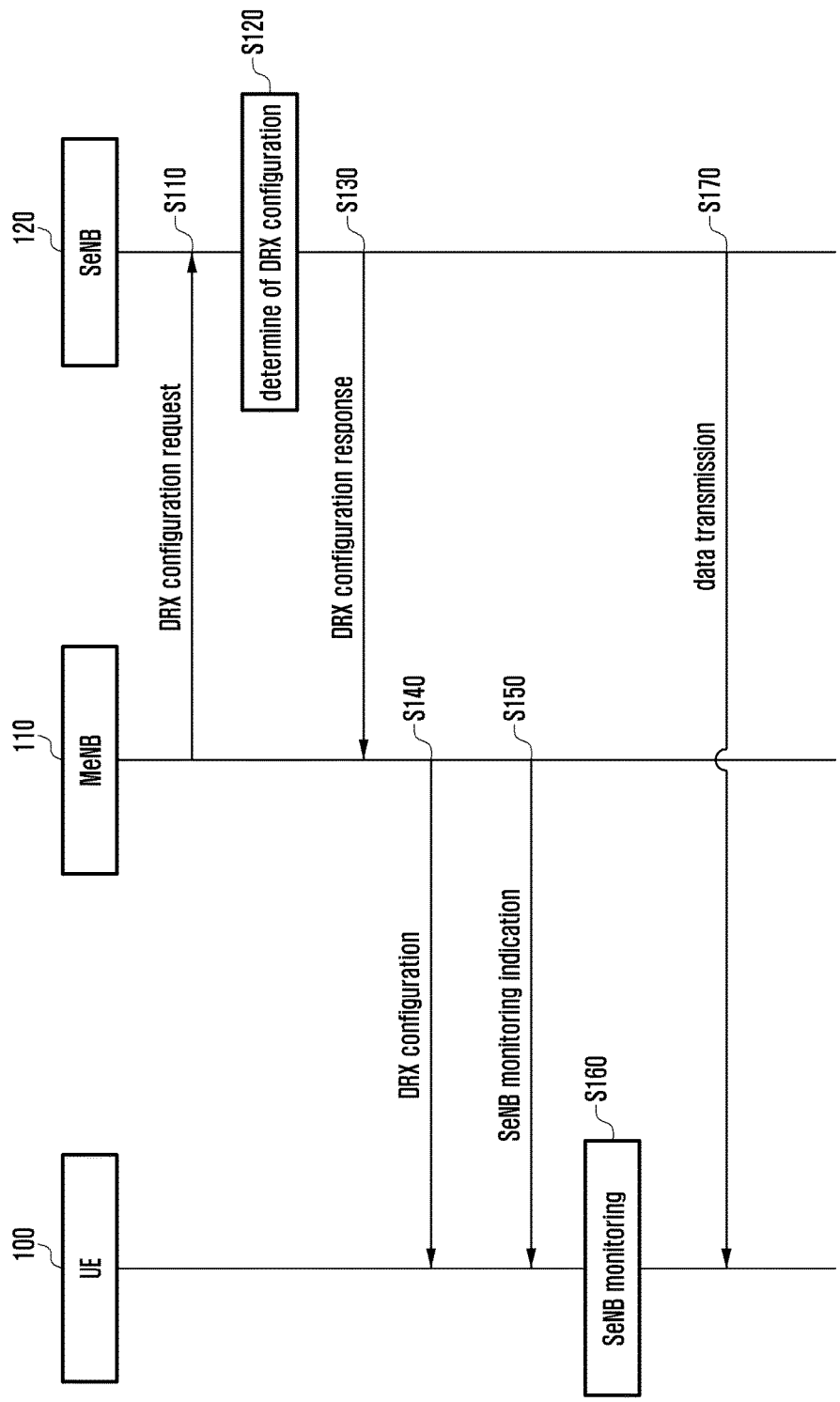
FIG. 6 is a signal flow diagram illustrating a method for controlling DRX according to an embodiment of the present invention.

FIG. 6 is a signal flow diagram illustrating a method for controlling DRX according to an embodiment of the present invention. Specifically, FIG. 6 is a signal flow diagram illustrating operations between a UE 100, an MeNB 110, and an SeNB 120.

Figure 7:
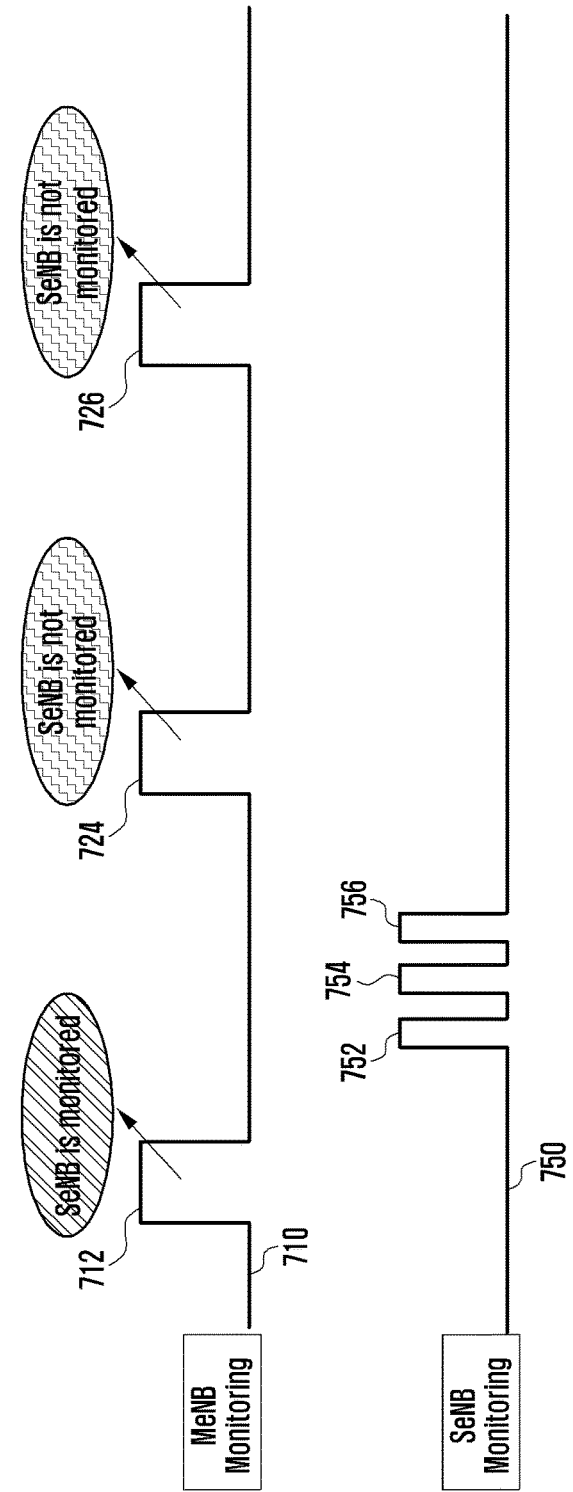
FIG. 7 illustrates an operation of a UE according to an embodiment of the present invention.

FIG. 7 illustrates an operation of a UE according to an embodiment of the present invention. Specifically, in FIG. 7, a time chart 710 indicates a DRX configuration of the MeNB 110 and a time chart 750 indicates a DRX configuration of the SeNB 120.

Referring to FIGS. 6 and 7, in step S110, the MeNB 110 transmits a DRX configuration request to the SeNB 120. For example, the DRX configuration request may include the DRX configuration of the MeNB 110. In step S110, it is assumed that the DRX of the MeNB 110 has already started.

In step S120, the SeNB 120 determines a DRX configuration. For example, the SeNB 120 may select a long DRX cycle identical to that of the MeNB 110. The SeNB 120 may determine its own DRX configuration based on the DRX configuration of the MeNB 110. In addition, the SeNB 120 may determine a start offset related to the long DRX cycle of the MeNB 110.

In step S130, the SeNB 120 transmits a DRX configuration response to the MeNB 110. For example, the DRX configuration response may include at least one of the DRX configuration and the start offset that were determined in step S120.

In step S140, the MeNB 110 transmits, to the UE 100, at least one of the DRX configuration and start offset of the SeNB 120. The transmitted DRX configuration of the SeNB 120 may be the same as the DRX configuration included in the DRX configuration response transmitted in step S130.

In step S150, the MeNB 110 transmits an SeNB monitoring indication to the UE 100. For example, the MeNB 110 may transmit the indication 520, as illustrated in FIG. 5, as the SeNB monitoring indication.

The indication 520 may be transmitted through a PDCCH. A field for the indication 520 may be defined in a downlink control information (DCI) format as defined in an existing LTE standard and the MeNB 110 may include the indication 520 in the field of a packet having the DCI format, which is transmitted to the UE 100. For example, in the field, 1 bit may be assigned.

A field for the indication 520 may be defined in a DCI format defined in an existing LTE standard and the MeNB 110 may include the indication 520 in the field of a packet having the DCI format, which is transmitted to the UE 100. For example, in the field, 1 bit may be assigned.

Alternatively, the indication 520 may be signaled in a MAC layer. Basically, the UE 100 monitors the SeNB, when the indication 520 has been signaled in the MAC layer, and the UE 100 does not monitor the SeNB, when the indication 520 has not been signaled. For example, the UE 100 monitors the SeNB when an indicator in the indication 520 is set to 1 and the UE 100 does not monitor the SeNB when the indicator in the indication 520 is set to 0.

Alternatively, the indication 520 may be signaled in an RRC layer. Basically, the UE 100 monitors the SeNB, when the indication 520 has been signaled in the RRC layer, and the UE 100 does not monitor the SeNB, when the indication 520 has not been signaled. For example, the UE 100 monitors the SeNB, when an indicator in the indication 520 is set to 1, and the UE 100 does not monitor the SeNB, when the indicator in the indication 520 is set to 0.

In step S160, the UE 100 starts SeNB monitoring. For example, the UE 100 monitors the SeNB based on the DRX configuration of the SeNB 120, which was received in step S140.

Referring to FIG. 7, when the UE 100 has received an SeNB monitoring indication from the MeNB 110 in a DRX activity duration 712, the UE 100 monitors short DRX activity durations 752, 754, and 765. Because there is no SeNB monitoring indication in DRX activity durations 724 and 726, the UE 100 does not monitor the SeNB 120.

Referring again to FIG. 6, in step S170, the SeNB 120 transmits data to the UE 100. The UE 100 receives the data based on the DRX configuration of the SeNB 120. The data may be received from the MeNB 110 by the SeNB 120 and may be received from a core network.

For example, referring again to FIG. 7, the UE 100 receives data from the SeNB 120 during the short DRX activity times 752, 754, and 765.

When a DRX of the MeNB 110 has not been started in step S110, an SeNB valid long DRX cycle, instead of a start offset, may be configured in step S120, and may be transmitted together with a DRX configuration in step S130. Herein, the SeNB valid long DRX cycle is only for the MeNB 110 and is not for the UE 100.

Figure 8:
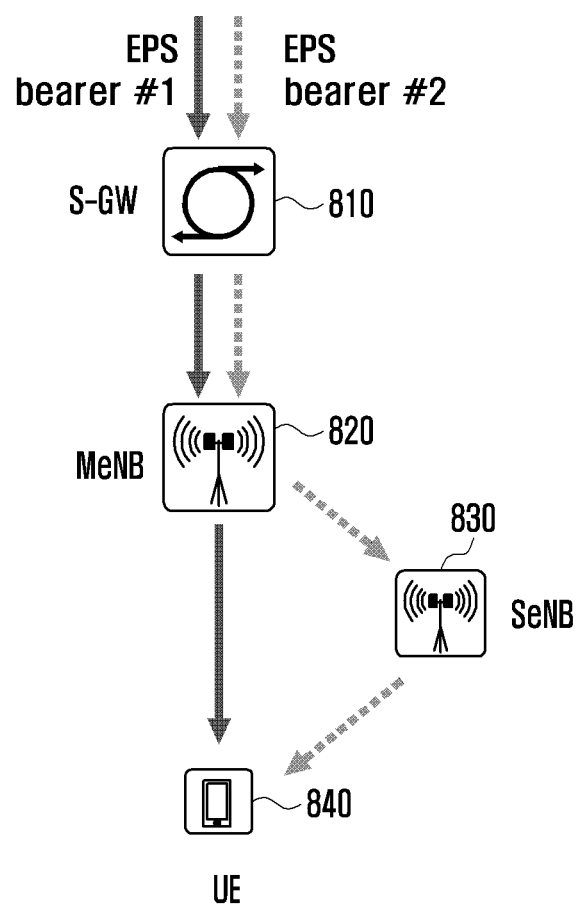
FIG. 8 illustrates a bearer being formed between a data network and a UE that is separated from a radio access network according to an embodiment of the present invention.

FIG. 8 illustrates a bearer formed between a data network and a UE that is separated from a radio access network according to an embodiment of the present invention.

Referring to FIG. 8, a first EPS bearer and a second EPS bearer are formed between a data network and a UE 840. The first EPS bearer is connected to the UE 840 through the S-GW 810 and the MeNB 820 in a core network and the second EPS bearer is connected to the UE 840 by being separated from a RAN node, e.g., by going from the MeNB 820 to an SeNB 830, and then from the SeNB 930 to the UE 840. Hereinafter, a wireless separation refers to a bearer formed between a data network and a UE, but separated from a radio access network (ran split).

Figure 9:
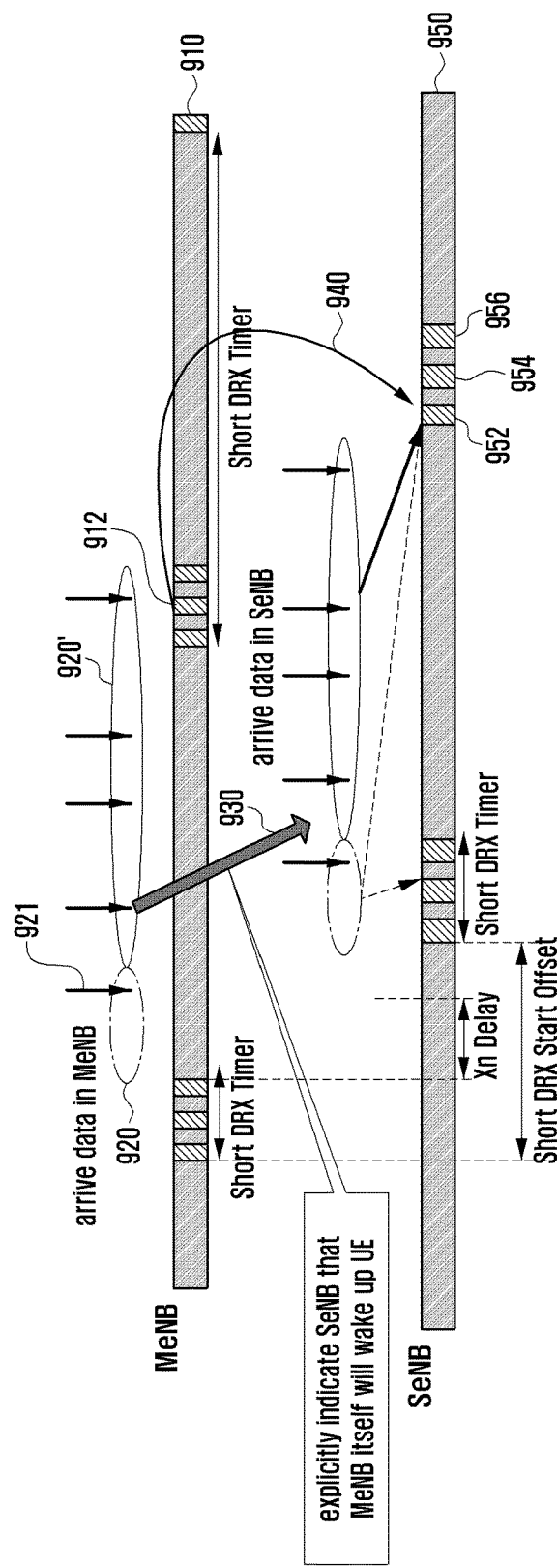
FIG. 9 illustrates a DRX configuration and operation, in a wireless separation, according to an embodiment of the present invention.

FIG. 9 illustrates a DRX configuration and operation, in a wireless separation, according to an embodiment of the present invention. In FIG. 9, a time chart 910 indicates a DRX configuration of the MeNB 110 and a time chart 950 indicates a DRX configuration of the SeNB 120.

Referring to FIG. 9, when data 920 and 920' to be transmitted from a core network to the SeNB 120 is received by the MeNB 110, the MeNB 110 may recognize data for the UE 100 therein.

The MeNB 110 determines the time to indicate to the UE 100 to monitor the SeNB 120, e.g., based at least on one of an Xn delay, a time at which the first data packet within the long DRX cycle is transmitted to the SeNB 120, and a start time of a following short DRX cycle of the SeNB 120. Herein, Xn may include X2, and the Xn delay refers to a delay on a backhaul transmission between the MeNB 110 and the SeNB 120.

When a difference between a time at which a first data packet within a long DRX cycle of the MeNB 110 is transmitted to the SeNB 120 and a time of the following short DRX cycle of the SeNB 120 is larger than the Xn delay, the MeNB 110 determines to indicate to the UE 100 to monitor the SeNB 120 on its own approaching DRX activity duration. When a difference between the time at which the first data packet within the long DRX cycle of the MeNB 110 is transmitted to the SeNB 120 and the time of the next short DRX cycle of the SeNB 120 is not larger than the Xn delay, the MeNB 110 determines to indicate to the UE 100 to monitor the SeNB 120 on a next DRX activity duration, after its own approaching DRX activity duration.

The MeNB 110 transmits an indicator 930, which indicates to the SeNB 120 that the MeNB 110 itself triggers the UE 100 to monitor the SeNB 120. In some embodiments, the indicator may be transmitted for only a first data packet 921, which is received from a core network by the MeNB 110, within the long DRX cycle of the MeNB 110, for an SeNB flow.

The MeNB 110 triggers the UE 100 to monitor the SeNB 120 in a DRX activity duration 912. For example, the MeNB 110 may transmit an indication 940 to the UE 100, indicating that the UE 100 is to monitor the SeNB 120.

In response to an SeNB monitoring indication, the UE 100 starts monitoring the SeNB 120. For example, the UE 100 may monitor the SeNB 120, based on the DRX configuration of the SeNB 120, which is received in step S140, as illustrated in FIG. 6. The UE 100 monitors short DRX activity durations 952, 954, and 956.

The SeNB 120 transmits data to the UE 100, on the short DRX activity durations 952, 954, and 956. The UE 100 receives the data based on the DRX configuration of the SeNB 120. That is, the UE 100 also receives data from the SeNB 120 on the short DRX activity durations 952, 954, and 965.

Figure 10:
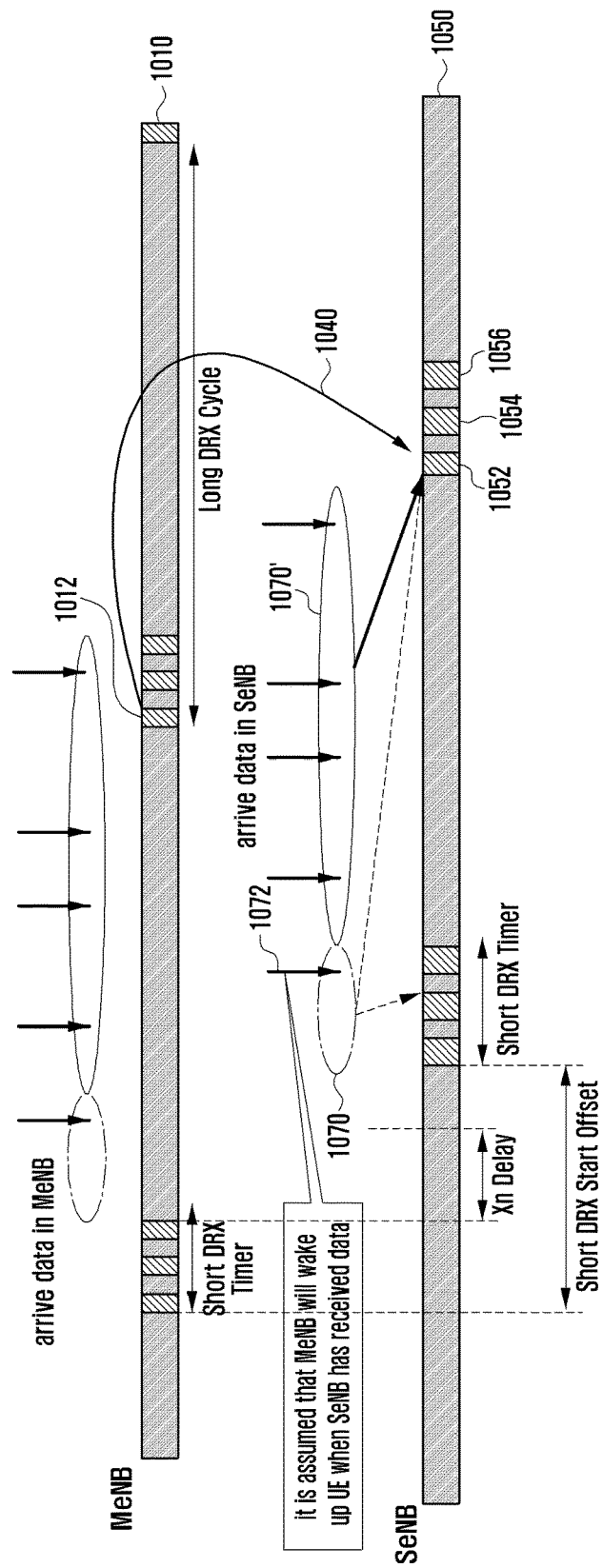
FIG. 10 illustrates a DRX configuration and operation, in a wireless separation, according to an embodiment of the present invention.

FIG. 10 illustrates a DRX configuration and operation in a wireless separation, according to an embodiment of the present invention. In FIG. 10, a time chart 1010 indicates a DRX configuration of the MeNB 110 and a time chart 1050 indicates a DRX configuration of the SeNB 120.

Referring to FIG. 10, when data to be transmitted from a core network to the SeNB 120 has been received by the MeNB 110, the MeNB 110 may recognize data for the UE 100 therein.

The MeNB 110 determines the time to indicate to the UE 100 to monitor the SeNB 120, e.g., based on at least one of an Xn delay, a time at which the first data packet within the long DRX cycle are transmitted to the SeNB 120, and a start time of a next short DRX cycle of the SeNB 120. Herein, Xn may include X2 and the Xn delay refers to a delay on a backhaul transmission between the MeNB 110 and the SeNB 120.

When a difference between a time at which a first data packet within a long DRX cycle of the MeNB 110 is transmitted to the SeNB 120 and a time of the following short DRX cycle of the SeNB 120 is larger than the Xn delay, the MeNB 110 determines to indicate to the UE 100 to monitor the SeNB 120 on its own approaching DRX activity duration. However, when the difference between the time at which the first data packet within the long DRX cycle of the MeNB 110 is transmitted to the SeNB 120 and the time of the following short DRX cycle of the SeNB 120 is not larger than the Xn delay, the MeNB 110 determines to indicate to the UE 100 to monitor the SeNB 120 on a next DRX activity duration, after its own approaching DRX activity duration.

The SeNB 120 receives data 1070 and 1070' from the MeNB 110. The data may be data received from a core network by the MeNB 110 within a long DRX cycle of the MeNB 110 for an SeNB flow. When the data has been received as indicated by reference numeral 1072, the SeNB 120 may recognize that the MeNB 110 triggers the UE to monitor the SeNB 120.

The MeNB 110 triggers the UE 100 to monitor the SeNB 120 on a DRX activity duration 1012. For example, the MeNB 110 may transmit an indication 1040 to the UE 100, indicating that the UE 100 is to monitor the SeNB 120.

In response to an SeNB monitoring indication, the UE 100 starts monitoring the SeNB 120. For example, the UE 100 may monitor the SeNB 120, based on the DRX configuration of the SeNB 120, which is received in step S140, as illustrated in FIG. 6. The UE 100 monitors short DRX activity durations 1052, 1054, and 1056.

The SeNB 120 transmits data to the UE 100. The SeNB 120 transmits data on the short DRX activity durations 1052, 1054, and 1056. Because the UE 100 receives the data based on the DRX configuration of the SeNB 120, the UE 100 also receives the data from the SeNB 120 on the short DRX activity durations 1052, 1054, and 1065.

Figure 11:
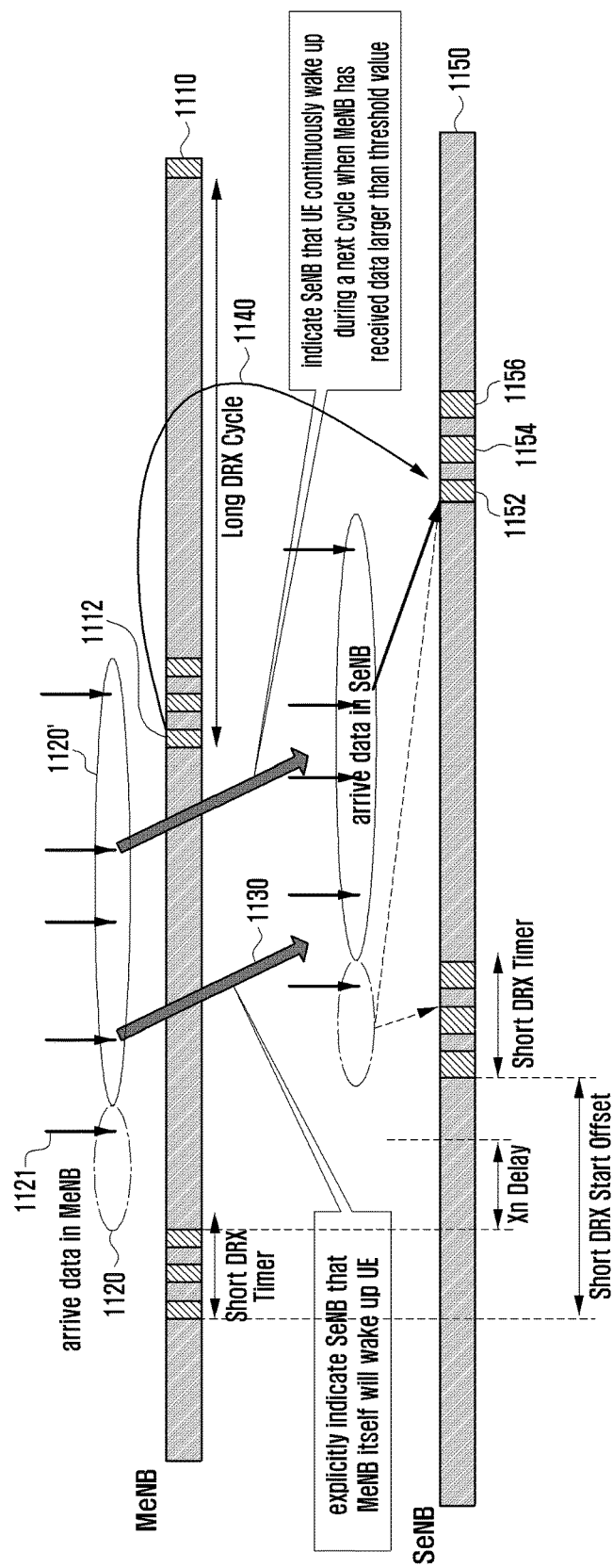
FIG. 11 illustrates a DRX configuration and operation, in a wireless separation, according to an embodiment of the present invention.

FIG. 11 illustrates a DRX configuration and operation, in a wireless separation, according to an embodiment of the present invention. In FIG. 11, a time chart 1110 indicates a DRX configuration of the MeNB 110 and a time chart 1150 indicates a DRX configuration of the SeNB 120.

Referring to FIG. 11, when the MeNB 110 receives data 1120 and 1120' to be transmitted from a core network to the SeNB 120, the MeNB 110 may recognize data for the UE 100 therein.

The MeNB 110 determines the time to indicate to the UE 100 to monitor the SeNB 120, e.g., based on at least one of an Xn delay, a time at which the first data packet within the long DRX cycle is transmitted to the SeNB 120, and a start time of a following short DRX cycle of the SeNB 120. Again, Xn may include X2, and the Xn delay refers to a delay on a backhaul transmission between the MeNB 110 and the SeNB 120.

When a difference between a time at which a first data packet within a long DRX cycle of the MeNB 110 is transmitted to the SeNB 120 and a time of the following short DRX cycle of the SeNB 120 is larger than the Xn delay, the MeNB 110 determines to indicate to the UE 100 to monitor the SeNB 120 on its own approaching DRX activity duration. However, when the difference between the time at which the first data packet within the long DRX cycle of the MeNB 110 is transmitted to the SeNB 120 and the time of the following short DRX cycle of the SeNB 120 is not larger than the Xn delay, the MeNB 110 determines to indicate to the UE 100 to monitor the SeNB 120 on a next DRX activity duration, after its own approaching DRX activity duration.

The MeNB 110 identifies a duration during which the UE 100 is to monitor the SeNB 120 or a number of times by which the UE 100 is to monitor the SeNB 120, based on an amount of data. For example, the MeNB 110 may identify a duration during which the UE 100 is to monitor the SeNB 120 or a number of times by which the UE 100 is to monitor the SeNB 120 based on a DRX configuration and an amount of data. Further, the MeNB 110 may calculate the number of SeNB long DRX cycles required to transmit the amount of data.

The MeNB 110 transmits, to the SeNB 120, an indicator 1130, which indicates that the MeNB 110 itself will trigger the UE 100 to monitor the SeNB 120. For example, the indicator 1130 may be transmitted for only a first data packet 1121, which is received from a core network by the MeNB 110, within the long DRX cycle of the MeNB 110, for an SeNB flow.

The indicator 1130 may include information on a duration during which the UE 100 is to monitor the SeNB 120 or the number of times by which the UE 100 is to monitor the SeNB 120. In some embodiments, when an indicator 1140 does not include information on the number of times, it may be interpreted that a long DRX cycle of the SeNB 120 indicates one time.

The MeNB 110 triggers the UE 100 to monitor the SeNB 120 on a DRX activity duration 1112. For example, the MeNB 110 may transmit an indication 1140 to the UE 100, indicating that the UE 100 is to monitor the SeNB 120.

In response to an SeNB monitoring indication, the UE 100 starts monitoring the SeNB 120. For example, the UE 100 may monitor the SeNB 120, based on a DRX configuration of the SeNB 120, which is received in step S140, as illustrated in FIG. 6. The UE 100 monitors short DRX activity durations 1152, 1154, and 1156. The indicator 1140 may include information on a duration during which the UE 100 is to monitor the SeNB 120 or the number of times by which the UE 100 is to monitor the SeNB 120. The UE 110 may identify an SeNB monitoring duration based on the information and then monitor the SeNB 120 based on the identified SeNB monitoring duration. When an SeNB monitoring indicator does not include information on the number of times, it may be interpreted that a long DRX cycle of the SeNB indicates one time.

The SeNB 120 transmits data to the UE 100 on the short DRX activity durations 1152, 1154, and 1156. Because the UE 100 receives the data based on the DRX configuration of the SeNB 120, the UE 100 also receives the data from the SeNB 120 on the short DRX activity durations 1152, 1154, and 1165.

Figure 12:
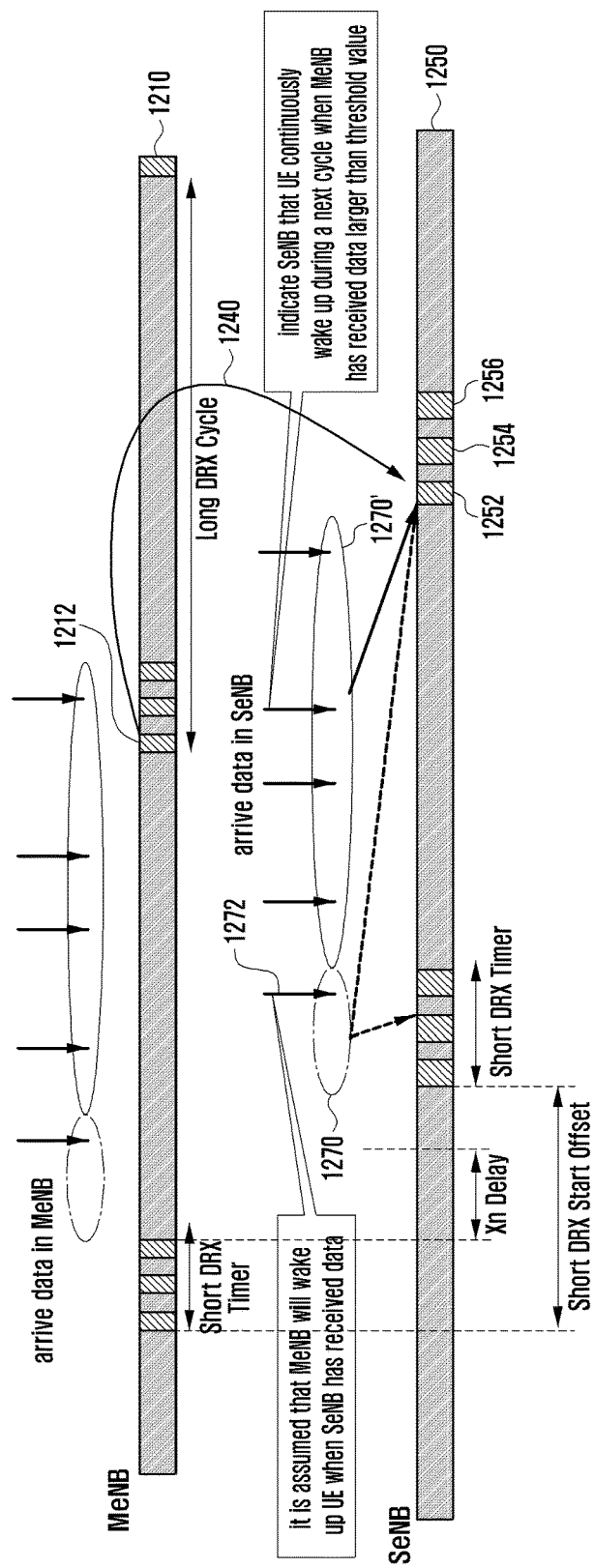
FIG. 12 illustrates a DRX configuration and operation, in a wireless separation, according to an embodiment of the present invention.

FIG. 12 illustrates a DRX configuration and operation, in a wireless separation, according to an embodiment of the present invention. In FIG. 12, a time chart 1210 indicates a DRX configuration of the MeNB 110 and a time chart 1250 indicates a DRX configuration of the SeNB 120.

Referring to FIG. 12, when the MeNB 110 receives data to be transmitted from a core network to the SeNB 120, the MeNB 110 may recognize data for the UE 100 therein.

The MeNB 110 determines the time to indicate to the UE 100 to monitor the SeNB 120, e.g., based on at least one of an Xn delay, a time at which the first data packet within the long DRX cycle is transmitted to the SeNB 120, and a start time of a following short DRX cycle of the SeNB 120. Again, Xn may include X2 and the Xn delay refers to a delay on a backhaul transmission between the MeNB 110 and the SeNB 120.

When a difference between a time at which a first data packet within a long DRX cycle of the MeNB 110 is transmitted to the SeNB 120 and a time of the following short DRX cycle of the SeNB 120 is larger than the Xn delay, the MeNB 110 determines to indicate to the UE 100 to monitor the SeNB 120 on its own approaching DRX activity duration. However, when the difference between the time at which the first data packet within the long DRX cycle of the MeNB 110 is transmitted to the SeNB 120 and the time of the following short DRX cycle of the SeNB 120 is not larger than the Xn delay, the MeNB 110 determines to indicate to the UE 100 to monitor the SeNB 120 on a next DRX activity duration, after its own approaching DRX activity duration.

The MeNB 110 identifies a duration for which the UE 100 is to monitor the SeNB 120 or the number of times by which the UE 100 is to monitor the SeNB 120, based on an amount of data. The MeNB 110 may also identify a duration for which the UE 100 is to monitor the SeNB 120 or the number of times by which the UE 100 is to monitor the SeNB 120, based on the DRX configuration and an amount of data. In some embodiments, MeNB 110 may calculate the number of SeNB long DRX cycles required to transmit the amount of data.

The SeNB 120 receives data 1270 and 1270' from the MeNB 110. The data may be data received from a core network by the MeNB 110 within a long DRX cycle of the MeNB 110 for an SeNB flow. When the data has been received, as indicated by reference numeral 1272, the SeNB 120 may recognize that the MeNB 110 triggers the UE 100 to monitor the SeNB 120. In addition, the SeNB 120 may identify a duration for which the UE 100 is to monitor the SeNB 120 or the number of times by which the UE 100 is to monitor the SeNB 120, based on the amount of data.

The MeNB 110 triggers the UE 100 monitor the SeNB 120 on a DRX activity duration 1312. Herein, the MeNB 110 may transmit an indication 1240 indicating that the UE 100 is to monitor the SeNB 120.

In response to an SeNB monitoring indication, the UE 100 starts monitoring the SeNB 120. For example, the UE 100 may monitor the SeNB 120 based on the DRX configuration of the SeNB 120, which is received in step S140, as illustrated in FIG. 6.

The UE 100 monitors short DRX activity durations 1252, 1254, and 1256. The indicator 1240 may include information on a duration for which the UE 100 is to monitor the SeNB 120 or the number of times by which the UE 100 is to monitor the SeNB 120. The UE 110 may identify an SeNB monitoring duration, based on the information, and then monitor the SeNB 120, based on the identified SeNB monitoring duration. When an SeNB monitoring indicator does not include information on the number of times, it may be interpreted that a long DRX cycle of the SeNB indicates one time.

The SeNB 120 transmits data to the UE 100 on the short DRX activity durations 1252, 1254, and 1256. Because the UE 100 receives the data based on the DRX configuration of the SeNB 120, the UE 100 also receives data from the SeNB 120 based on the short DRX activity durations 1252, 1254, and 1265.

Figure 13:
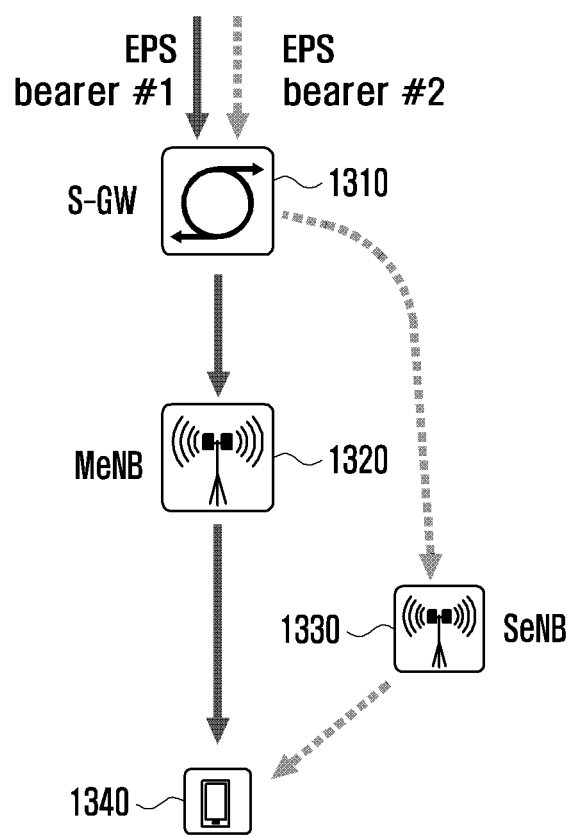
FIG. 13 illustrates a bearer formed between a data network and a UE that is separated from a core network according to an embodiment of the present invention.

FIG. 13 illustrates a bearer formed between a data network and a UE that is separated from a core network according to an embodiment of the present invention.

Referring to FIG. 13, a first EPS bearer and a second EPS bearer are formed between a data network and a terminal. The first EPS bearer is connected to a UE 1340 through an MeNB 1320 in the core network and the second EPS bearer is connected to the UE 1340 by being separated from a core network node (i.e., through an S-GW 1310 and an SeNB 1330. Hereinafter, a core network separation (or split) refers to a bearer formed between a data network and a UE that is separated from the core network).

Figure 14:
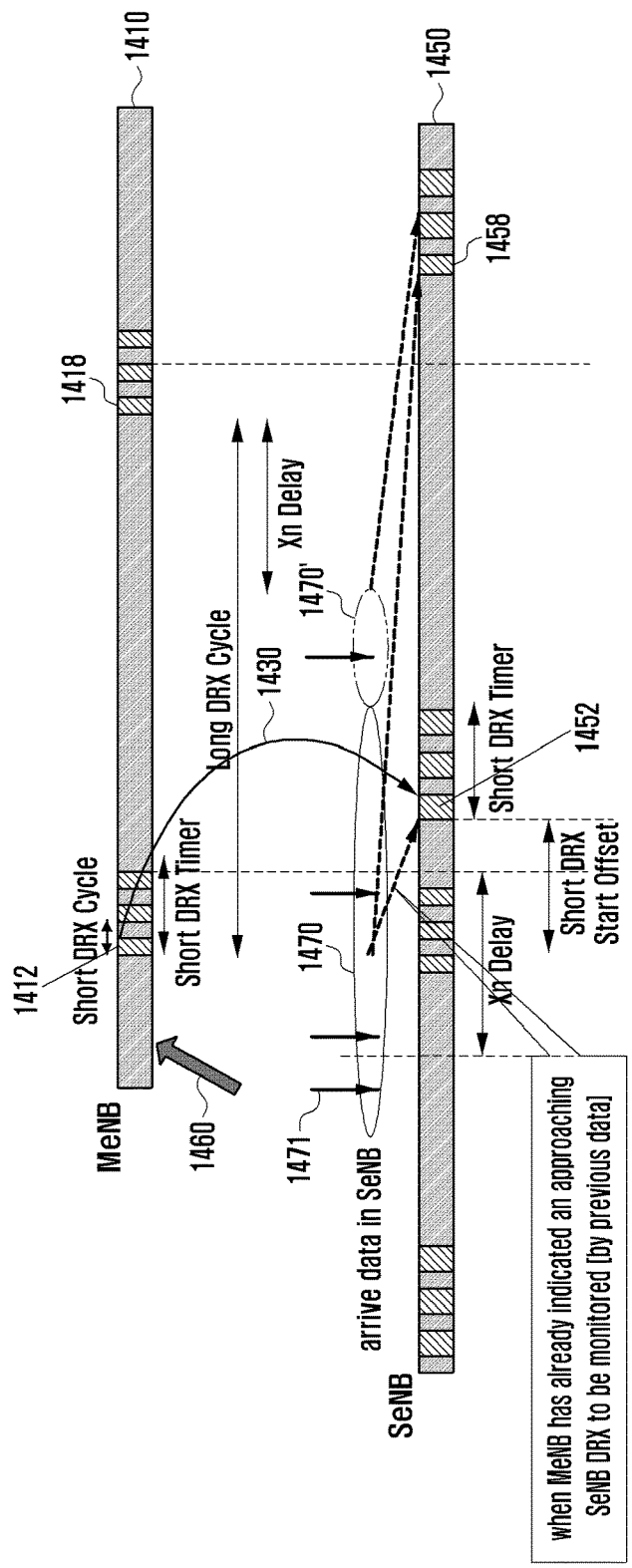
FIG. 14 illustrates a DRX configuration and operation, in a core network separation, according to an embodiment of the present invention.

FIG. 14 illustrates a DRX configuration and operation, in a core network separation, according to an embodiment of the present invention. In FIG. 14, a time chart 1410 indicates a DRX configuration of the MeNB 110 and a time chart 1450 indicates a DRX configuration of the SeNB 120.

Referring to FIG. 14, the SeNB 120 receives, from a core network, data 1470 and 1470' to be transmitted to the UE 100.

In response to the data reception, the SeNB 120 transmits, to the MeNB 110, a UE wake-up request 1460, which requests the MeNB 110 to wake the UE 100 up. The SeNB 120 may determine the time to transmit the UE wake-up request 1460 based on at least one of a Xn delay, a time at which the SeNB 120 has received a first data packet in a long DRX cycle of the MeNB 110 from the core network, and a start time of a following long DRX cycle of the MeNB 110.

When a time difference between a time at which the SeNB 120 has received a first data packet 1471 in the long DRX cycle of the MeNB 110 from the core network and a time 1418 of the following long DRX cycle of the MeNB 110 is larger than the Xn delay, the SeNB 120 transmits the UE wake-up request 1460, to the MeNB 110, in an approaching long DRX cycle 1412 of the MeNB 110. However, when the time difference between the time at which the SeNB 120 has received the first data packet 1471 in the long DRX cycle of the MeNB 110 from the core network and the time 1418 of the following long DRX cycle of the MeNB 110 is not larger than the Xn delay, the SeNB 120 transmits the UE wake-up request 1460, to the MeNB 110, in a following long DRX cycle 1418 of an approaching long DRX cycle of the MeNB 110.

In response to a reception of the UE wake-up request 1460, the MeNB 110 may determine the time to indicate to the UE 100 to monitor the SeNB 120. Herein, the MeNB 110 may determine the time to indicate to the UE 100 to monitor the SeNB 120 based on information included in the UE wake-up request 1460.

The MeNB 110 triggers the UE 100 to monitor the SeNB 120 on a DRX activity duration 1412. For example, the MeNB 110 may transmit an indication 1430 to the UE 100, indicating that the UE 100 is to monitor the SeNB 120.

In response to an SeNB monitoring indication, the UE 100 starts monitoring the SeNB 120. For example, the UE 100 may monitor the SeNB 120, based on a DRX configuration of the SeNB 120, which is received in step S140, as illustrated in FIG. 6. The UE 100 monitors a short DRX activity duration.

The SeNB 120 transmits data to the UE 100. When the previous data has already indicated to the MeNB 110 to monitor the approaching DRX of the SeNB 120, the SeNB 120 may transmit data in an approaching short DRX activity duration 1452 at the time when the data has arrived. When the previous data has not already indicated to the MeNB 110 to monitor the approaching DRX of the SeNB 120, the SeNB 120 may transmit data on the short DRX activity duration 1452 within an approaching long DRX cycle of the MeNB 110 or a short DRX activity duration in a following long DRX cycle of the approaching long DRX cycle of the MeNB 110 at a time when the data has arrived.

The UE 100 receives the data based on the DRX configuration of the SeNB 120, i.e., on the short DRX activity duration.

Figure 15:
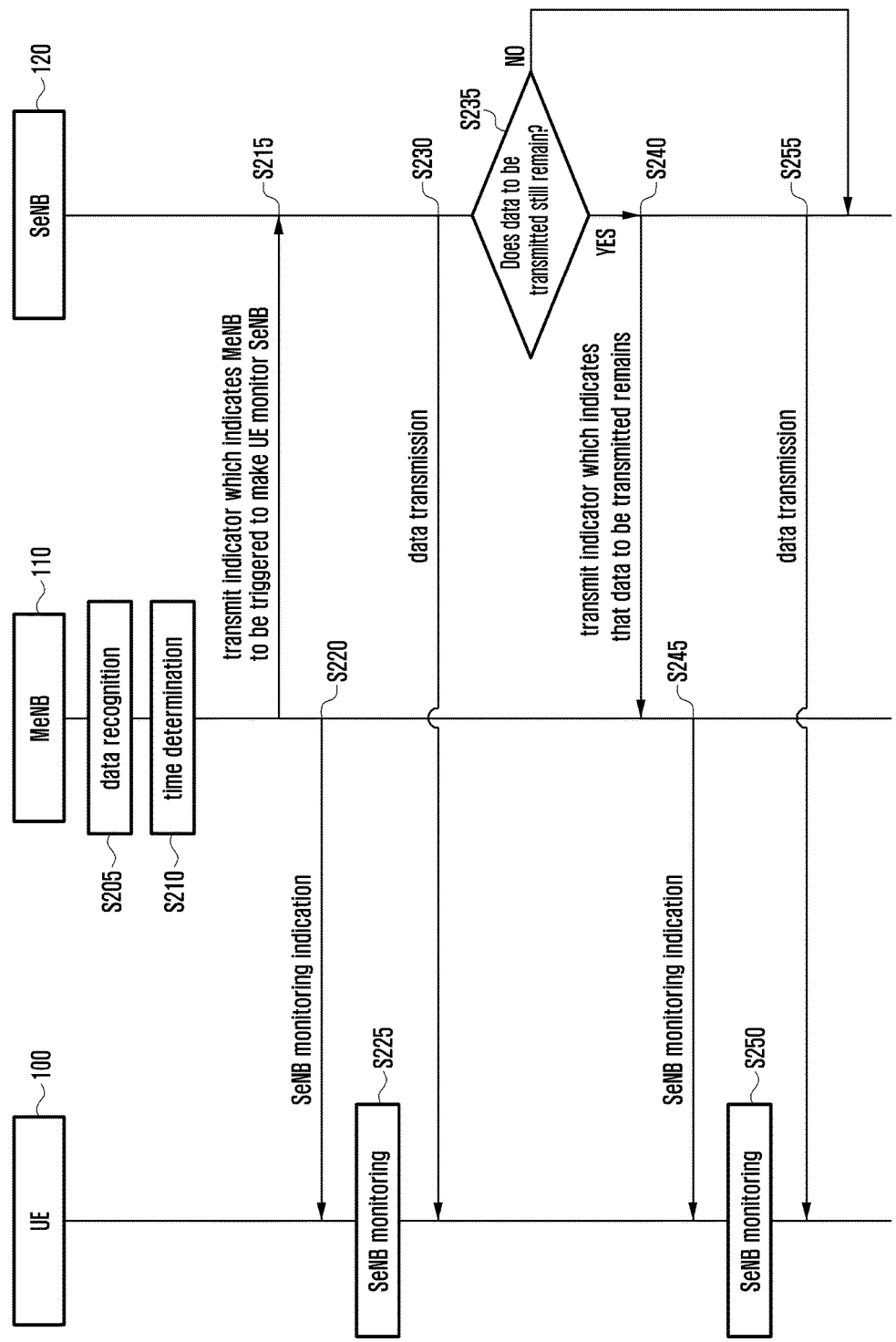
FIG. 15 is a signal flow diagram illustrating a method for controlling DRX, in a wireless separation, according to an embodiment of the present invention.

FIG. 15 is a signal flow diagram illustrating a method for controlling DRX, in a wireless separation, according to an embodiment of the present invention.

Referring to FIG. 15, in step S205, an MeNB 110 recognizes data to be transmitted to a UE 100 through a SeNB 120. For example, when the MeNB 110 receives data to be transmitted from a core network to the SeNB 120, the MeNB 110 may recognize data for the UE 100 therein.

In step S210, the MeNB 110 determines the time to indicate to the UE 100 to monitor the SeNB 120, e.g., based on at least one of an Xn delay, a time at which a first data packet within a long DRX cycle is transmitted to the SeNB 120, and a start time of a following short DRX cycle of the SeNB 120.

As described above, when a difference between a time at which a first data packet within a long DRX cycle of the MeNB 110 is transmitted to the SeNB 120 and a time of the following short DRX cycle of the SeNB 120 is larger than the Xn delay, the MeNB 110 determines to indicate to the UE 100 to monitor the SeNB 120 on its own approaching DRX activity duration. However, when the difference between the time at which the first data packet within the long DRX cycle of the MeNB 110 is transmitted to the SeNB 120 and the time of the following short DRX cycle of the SeNB 120 is not larger than the Xn delay, the MeNB 110 determines to indicate to the UE 100 to monitor the SeNB 120 on a next DRX activity duration, after its own approaching DRX activity duration.

In step S215, the MeNB 110 transmits an indicator, to the SeNB 120, indicating that the MeNB 110 itself will trigger the UE 100 to monitor the SeNB 120. The MeNB 110 may transmit, to the SeNB 120, data, which is received from the core network by the MeNB 110 within the long DRX cycle of the MeNB 110 for an SeNB flow.

In some embodiments, the indicator may be transmitted for only a first data packet 921, which is received from the core network by the MeNB 110 within the long DRX cycle of the MeNB 110 for an SeNB flow. The indicator may be referred to as a UE WAKE UP INDICATION (UE_WAKE-UP_IND).

In step S220, the MeNB 110 transmits an SeNB monitoring indication to the UE 100. The indication may be transmitted at a time determined in step S210. For example, step S220 may include step S150, as illustrated in FIG. 6, and the MeNB 110 may transmit an indication 940. as illustrated in FIG. 9.

In step S225, the UE 100 starts monitoring the SeNB 120. For example, the UE 100 may monitor the SeNB 120, based on the DRX configuration of the SeNB 120, which is received in step S140, as illustrated in FIG. 6. The UE 100 monitors short DRX activity durations 952, 954, and 956. Step S225 may include step S160, as illustrated in FIG. 6.

In step S230, the SeNB 120 transmits data to the UE 100. The data may include data received from the MeNB 110. For example, the SeNB 120 transmits data on a short DRX activity duration and the UE 100 receives the data, based on the DRX configuration of the SeNB 120. That is, the UE 100 receives data from the SeNB 120 on the short DRX activity duration. Step S230 may include step S170, as illustrated in FIG. 6.

In step S235, the SeNB 120 identifies whether data to be transmitted still remains.

When there is still data to be transmitted, the SeNB 120 transmits an indicator, which indicates that there is still data to be transmitted, to the MeNB 110, in step S240. In response to the indicator, the MeNB 110 may determine to indicate to the UE 100 to monitor the SeNB 120 on an approaching DRX activity duration of the MeNB 110 itself.

In step S245, the MeNB 110 transmits an SeNB monitoring indication to the UE 100. For example, the MeNB 110 may transmit the SeNB monitoring indication on the approaching DRX activity duration of the MeNB 110 itself. Herein, step S245 corresponds to step S220.

In response to the SeNB monitoring indication, the UE 100 starts monitoring the SeNB 120 in step S250. Herein, step S250 corresponds to step S225.

In step S255, the SeNB 120 transmits data to the UE 100. Herein, step S255 corresponds to step S230.

Figure 16:
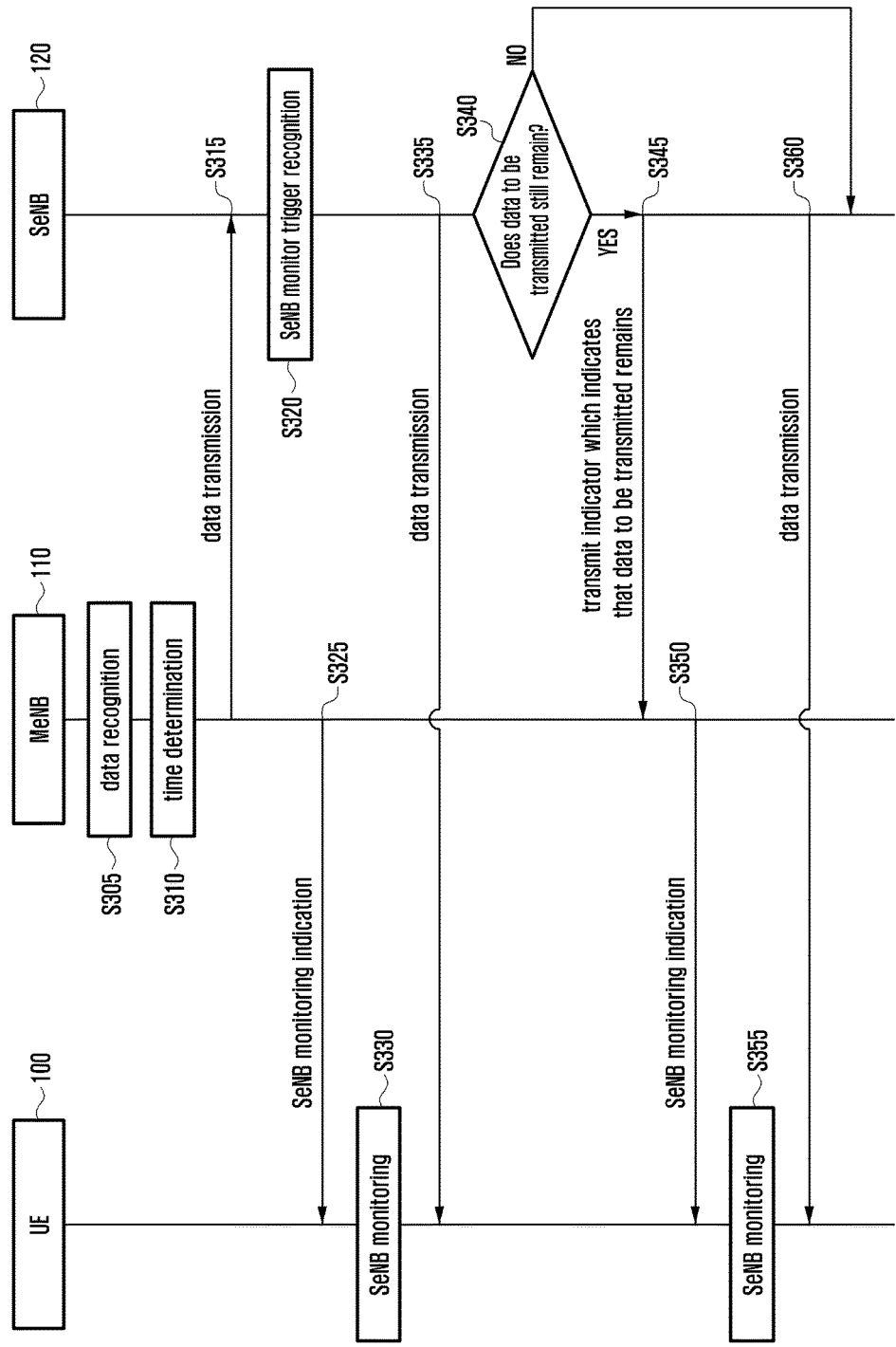
FIG. 16 is a signal flow diagram illustrating a method for controlling DRX, in a wireless separation, according to an embodiment of the present invention.

FIG. 16 is a signal flow diagram illustrating a method for controlling DRX, in a wireless separation, according to an embodiment of the present invention.

Referring to FIG. 16, in step S305, the MeNB 110 recognizes data to be sent to the UE 100 through the SeNB 120.

In step 310, the MeNB 110 determines the time to indicate to the UE 100 to monitor the SeNB 120, e.g., based on at least one of an Xn delay, a time at which a first data packet within a long DRX cycle is transmitted to the SeNB 120, and a start time of a following short DRX cycle of the SeNB 120.

When a difference between a time at which the first data packet within the long DRX cycle of the MeNB 110 is transmitted to the SeNB 120 and a time of the following short DRX cycle of the SeNB 120 is larger than the Xn delay, the MeNB 110 determines to indicate to the UE 100 to monitor the SeNB 120 on its own approaching DRX activity duration. However, when the difference between the time at which the first data packet within the long DRX cycle of the MeNB 110 is transmitted to the SeNB 120 and the time the following short DRX cycle of the SeNB 120 is not larger than the Xn delay, the MeNB 110 determines to indicate to the UE 100 to monitor the SeNB 120 on a next DRX activity duration, after its own approaching DRX activity duration.

In step S315, the MeNB 110 transmits data to the SeNB 120. for example, the data may be data that was received by the MeNB 110 from a core network within a long DRX cycle of the MeNB 110 for an SeNB flow.

In step S320, the SeNB 120 recognizes that the MeNB 110 triggers the UE to monitor the SeNB 120.

In step S325, the MeNB 110 transmits an SeNB monitoring indication to the UE 100. Herein, the indication may be transmitted at the time determined in step S310. For example, step S325 may include step S150, as illustrated in FIG. 6, and the MeNB 110 may transmit an indication 1040, as illustrated in FIG. 10.

In step S330, the UE 100 starts monitoring SeNB 120. For example, the UE 100 may monitor the SeNB 120, based on the DRX configuration of the SeNB 120, which is received in step S140, as illustrated in FIG. 6.

The UE 100 monitors short DRX activity durations 1052, 1054, and 1056. For example, step S330 may include step S160, as illustrated in FIG. 6.

In step S335, the SeNB 120 transmits, to the UE 100, the data received in step S315. Herein, the SeNB 120 transmits data on a short DRX activity duration and the UE 100 receives the data based on the DRX configuration of the SeNB 120. That is, the UE 100 receives data from the SeNB 120 on the short DRX activity duration. For example, step S335 may include step S170, as illustrated in FIG. 6.

In step S340, the SeNB 120 identifies whether there is still data to be transmitted.

When there is still data to be transmitted, the SeNB 120 transmits an indicator, to the MeNB 110, indicating that there is still data to be transmitted, in step S345. In response to the indicator reception, the MeNB 110 may determine to indicate to the UE 100 to monitor the SeNB 120 on an approaching DRX activity duration of the MeNB 110 itself.

In step S350, the MeNB 110 transmits an SeNB monitoring indication to the UE 100. The MeNB 110 may transmit the SeNB monitoring indication on the approaching DRX activity duration of the MeNB 110 itself. Herein, step S350 corresponds to step S325.

In step S355, the UE 100 starts monitoring SeNB 120. Herein, step S355 corresponds to step S330.

In step S360, the same as in step S325, the SeNB 120 transmits data to the UE 100.

Figure 17:
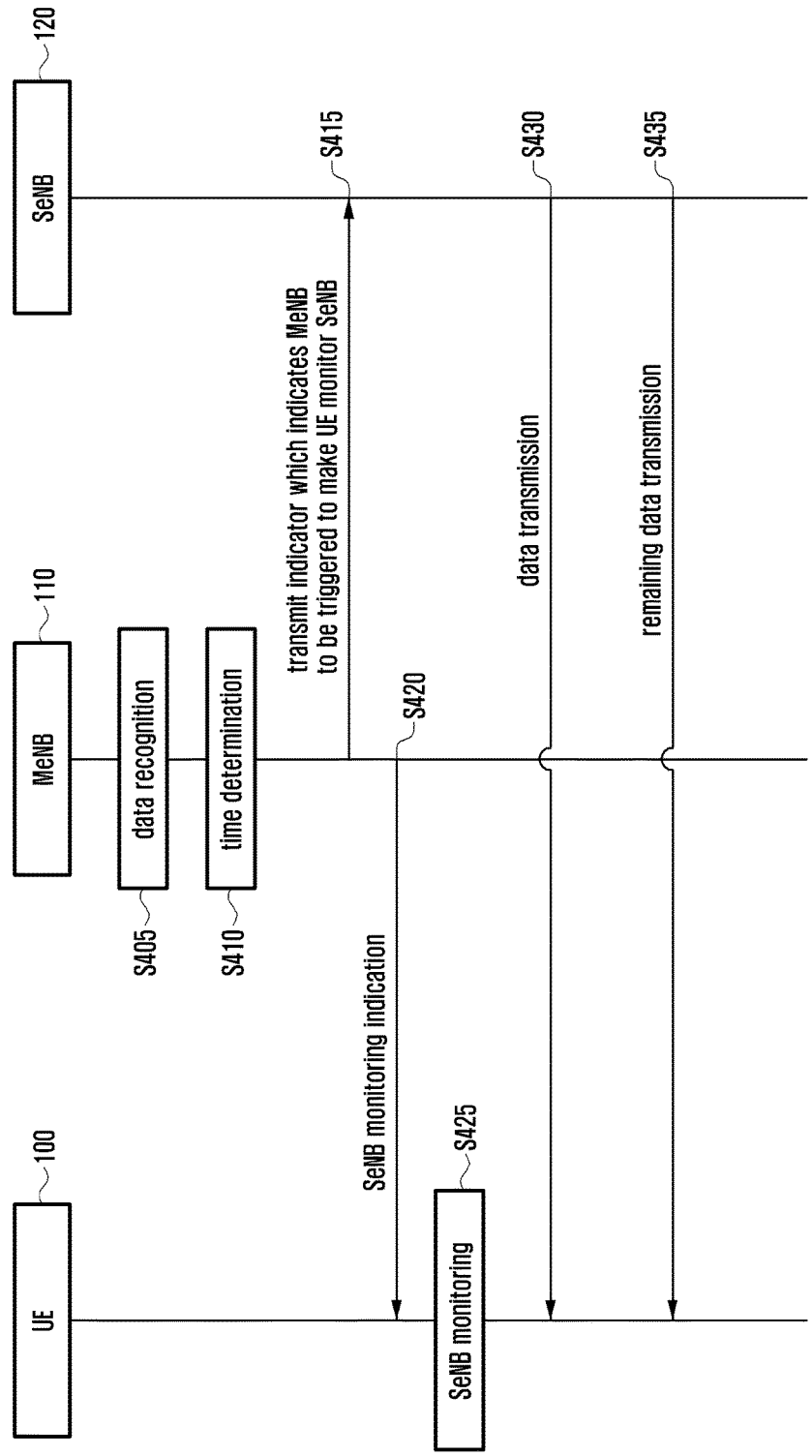
FIG. 17 is a signal flow diagram illustrating a method for controlling DRX, in a wireless separation, according to an embodiment of the present invention.

FIG. 17 is a signal flow diagram illustrating a method for controlling DRX, in a wireless separation, according to an embodiment of the present invention.

Referring to FIG. 17, in step S405, the MeNB 110 recognizes data to be transmitted to the UE 100 through the SeNB 120.

In step S410, the MeNB 110 determines a time to indicate to the UE 100 to monitor the SeNB 120. In step S410, the MeNB 110 identifies a duration for which the UE is to monitor the SeNB 110 or the number of times by which the UE 100 is to monitor the SeNB 120, based on an amount of data. The MeNB 110 may also identify a duration for which the UE 100 is to monitor the SeNB 110 or the number of times by which the UE 100 is to monitor the SeNB 120, based on the DRX configuration and the amount of data of the SeNB 120. In some embodiments, MeNB 110 may calculate the number of SeNB long DRX cycles required to transmit the amount of data.

Further, the MeNB 110 may determine the time to indicate to the UE 100 to monitor the SeNB 120, based on at least one of an Xn delay, a time at which a first data packet within a long DRX cycle is transmitted to the SeNB 120, and a start time of a following short DRX cycle of the SeNB 120.

When a difference between the time at which the first data packet within the long DRX cycle of the MeNB 110 is transmitted to the SeNB 120 and a time of the following short DRX cycle of the SeNB 120 is larger than the Xn delay, the MeNB 110 determines to indicate to the UE 100 to monitor the SeNB 120 on its own approaching DRX activity duration. However, when the difference between the time at which the first data packet within the long DRX cycle of the MeNB 110 is transmitted to the SeNB 120 and the time of the following short DRX cycle of the SeNB 120 is not larger than the Xn delay, the MeNB 110 determines to indicate to the UE 100 to monitor the SeNB 120 on a next DRX activity duration, after its own approaching DRX activity duration.

In step S415, the MeNB 110 transmits an indicator, to the SeNB 120, indicating that the MeNB 110 itself will trigger the UE to monitor the SeNB 120. The MeNB 110 may transmit, to the SeNB 120, data, which is received from a core network within the long DRX cycle of the MeNB 110 for an SeNB flow.

In some embodiments, the indicator may be transmitted for only a first data packet 921 that is received from the core network by the MeNB 110 within the long DRX cycle of the MeNB 110 for an SeNB flow.

The indicator may be referred to as a UE WAKE UP INDICATION (UE_WAKEUP_IND), which may include information on a duration for which the UE 100 is to monitor the SeNB 120 or the number of times by which the UE 100 is to monitor the SeNB 120.

In some embodiments, when UE_WAKEUP_IND does not include information on the number of times, it may be interpreted that a long DRX cycle of the SeNB indicates one time.

In step S420, the MeNB 110 transmits an SeNB monitoring indication to the UE 100. Herein, the indication may be transmitted at the time determined in step S410. For example, step S420 may include step S150, as illustrated in FIG. 6, and the MeNB 110 may transmit an indication 1140, as illustrated in FIG. 11.

In step S425, the UE 100 starts monitoring SeNB 120. For example, the UE 100 may monitor the SeNB 120, based on the DRX configuration of the SeNB 120, which is received in step S140, as illustrated in FIG. 6.

The UE 100 monitors short DRX activity durations 1152, 1154, and 1156. Step S425 may include step S160, as illustrated in FIG. 6.

In step S430, the SeNB 120 transmits, to the UE 100, data received from the MeNB 110. Herein, the SeNB 120 transmits data on a short DRX activity duration and the UE 100 receives the data based on the configuration of the SeNB 120. That is, the UE 100 receives data from the SeNB 120 on the short DRX activity duration. For example, step S430 may include step S170, as illustrated in FIG. 6.

In step S435, the SeNB 120 transmits the remaining data to the UE 100. In some embodiments, the MeNB 110 may additionally transmit the SeNB monitoring indication to the UE 100 in order to receive the remaining data.

In some embodiments, the SeNB monitoring indication transmitted in step S420 may include information on a duration for which the UE 100 is to monitor the SeNB 110 or the number of times by which the UE 100 is to monitor the SeNB 110. The UE 110 may identify an SeNB monitoring duration, based on the information, and then monitor the SeNB 120, based on the identified SeNB monitoring duration.

When an SeNB monitoring indicator does not include information on the number of times, it may be interpreted that a long DRX cycle of the SeNB indicates one time.

Figure 18:
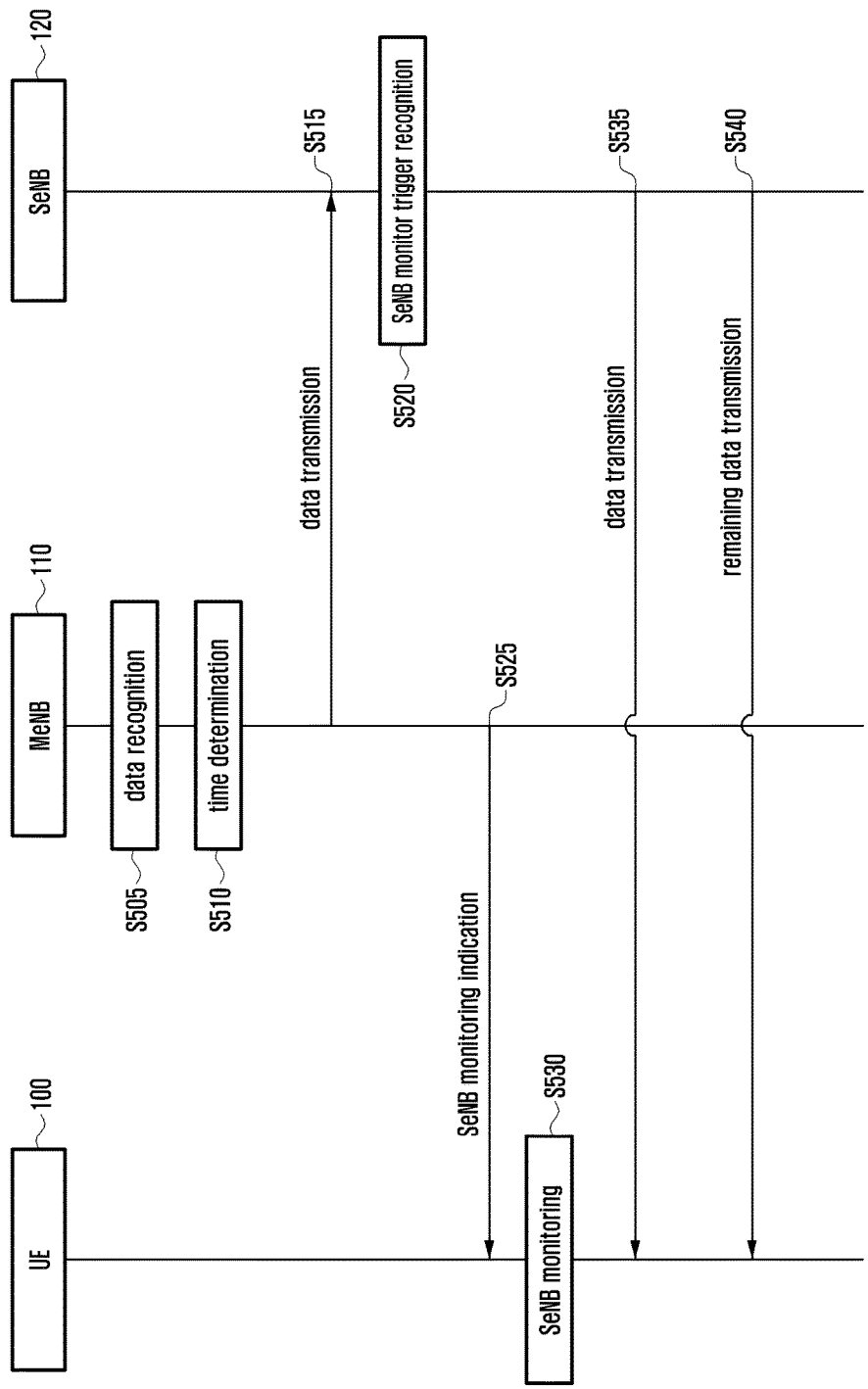
FIG. 18 is a signal flow diagram illustrating a method for controlling DRX, in a wireless separation, according to an embodiment of the present invention.

FIG. 18 is a signal flow diagram illustrating a method for controlling DRX, in a wireless separation, according to as embodiment of the present invention.

Referring to FIG. 18, in step S505, the MeNB 110 recognizes data to be transmitted to the UE 100 through the SeNB 120.

In step S510, the MeNB 110 determines the time to indicate to the UE 100 to monitor the SeNB 120. For example, the MeNB 110 may identify a duration for which the UE 100 is to monitor the SeNB 120 or the number of times by which the UE 100 is to monitor the SeNB 120, based on an amount of data. Additionally, the MeNB 110 may identify a duration for which the UE 100 is to monitor the SeNB 120 or the number of times by which the UE 100 is to monitor the SeNB 120, based on the DRX configuration and an amount of data of the SeNB 120. In some embodiments, MeNB 110 may calculate the number of SeNB long DRX cycles required to transmit the amount of data.

Further, the MeNB 110 may determine the time to indicate the UE 100 to monitor the SeNB 120, based on at least one of an Xn delay, a time at which a first data packet within a long DRX cycle is transmitted to the SeNB 120, and a start time of a following short DRX cycle of the SeNB 120.

In some embodiments, when a difference between the time at which the first data packet the a long DRX cycle of the MeNB 110 is transmitted to the SeNB 120 and the time of the following short DRX cycle of the SeNB 120 is larger than the Xn delay, the MeNB 110 determines to indicate to the UE 100 to monitor the SeNB 120 on the approaching own DRX activity duration. However, when the difference between the time at which the first data packet within the long DRX cycle of the MeNB 110 is transmitted to the SeNB 120 and the time of the following short DRX cycle of the SeNB 120 is not larger than the Xn delay, the MeNB 110 determines to indicate to the UE 100 to monitor the SeNB 120 on a next DRX activity duration, after its own approaching DRX activity duration.

In step S515, the MeNB 110 transmits, to the SeNB 120, data received from a core network within a long DRX cycle of the MeNB 110 for an SeNB flow.

In step S520, the SeNB 120 recognizes that the MeNB 110 triggers the UE monitor the SeNB 120. In step S520, the SeNB 120 identifies a duration for which the UE is to monitor the SeNB 120 or the number of times by which the UE 100 is to monitor the SeNB 120, based on the amount of data.

In step S520, the MeNB 110 transmits an SeNB monitoring indication to the UE 100. Herein, the indication may be transmitted at the time determined in step S510. For example, step S520 may include step S150, as illustrated in FIG. 6, and the MeNB 110 may transmit an indication 1140, as illustrated in FIG. 11.

In step S525, the UE 100 starts to monitor the SeNB 120. For example, the UE 100 may monitor the SeNB 120, based on the DRX configuration of the SeNB 120, which is received in step S140, as illustrated in FIG. 6.

The UE 100 monitors short DRX activity durations 1252, 1254, and 1256. For example, step S525 may include step S160, as illustrated in FIG. 6.

In step S530, the SeNB 120 transmits, to the UE 100, data received from the MeNB 110. Herein, the SeNB 120 transmits data on a short DRX activity duration, and the UE 100 receives the data based on the DRX configuration of the SeNB 120. That is, the UE 100 receives data from the SeNB 120 on the short DRX activity duration. For example, step S530 may include step S170, as illustrated in FIG. 6.

In step S535, the SeNB 120 transmits the remaining data to the UE 100. In some embodiments, the MeNB 110 may additionally transmit the SeNB monitoring indication to the UE 100 in order to receive the remaining data.

In some embodiments, the SeNB monitoring indication transmitted in step S520 may include information on a duration for which the UE 100 is to monitor the SeNB 120 or the number of times by which the UE 100 is to monitor the SeNB 120. The UE 110 may identify an SeNB monitoring duration, based on the information, and then monitor the SeNB 120, based on the identified SeNB monitoring duration.

Figure 19:
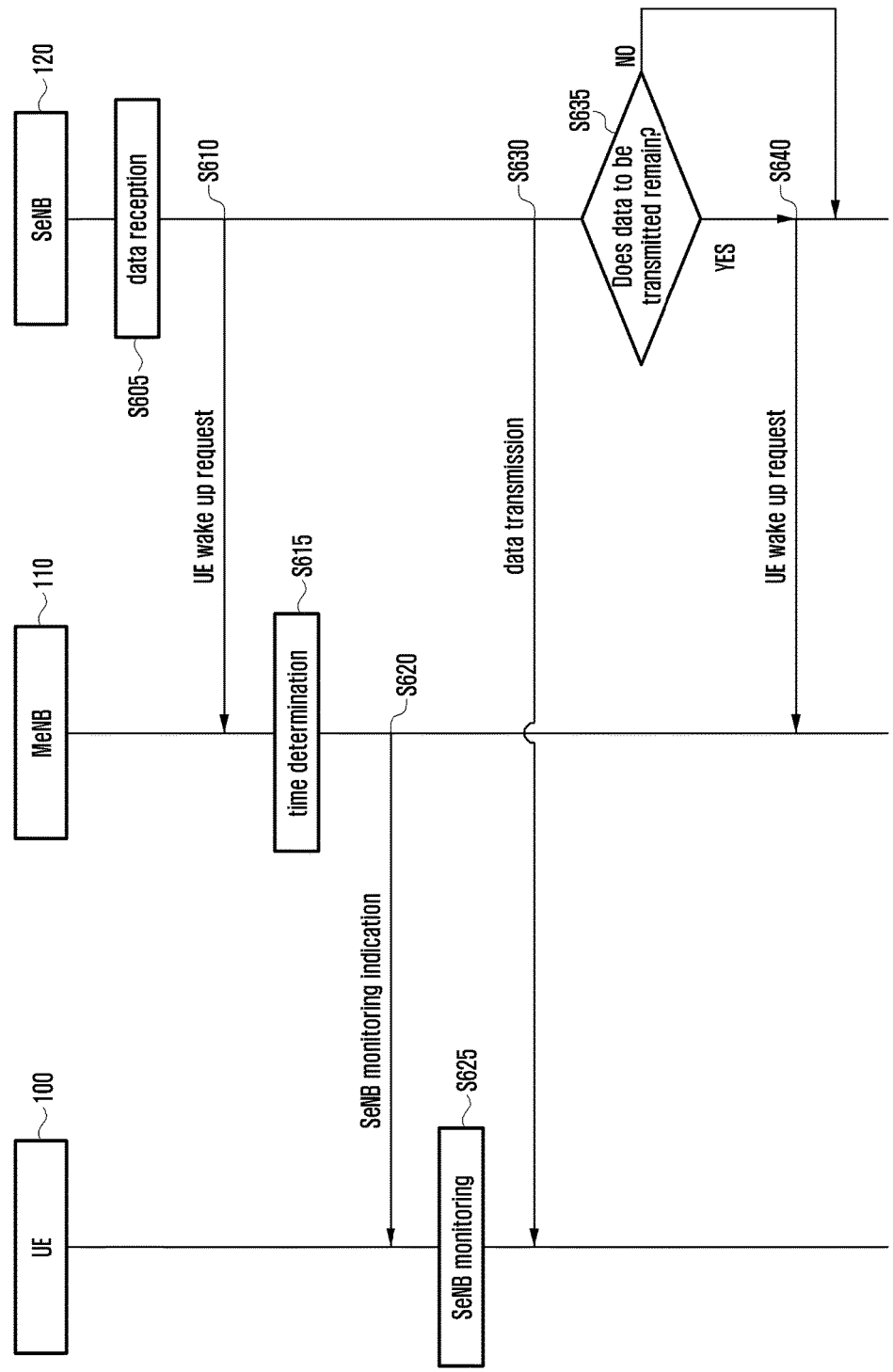
FIG. 19 is a signal flow diagram illustrating a method for controlling DRX, in a core network separation, according to an embodiment of the present invention.

When an SeNB monitoring indicator does not include information on the number of times, it may be interpreted that a long DRX cycle of the SeNB indicates one time. FIG. 19 is a signal flow diagram illustrating a method for controlling DRX, in a wireless separation, according to an embodiment of the present invention.

Referring to FIG. 19, in step S605, the SeNB 120 receives data to be transmitted to the UE 100 from a core network.

In step S610, the SeNB 120 transmits a UE wake-up request, to the MeNB 110, requesting the MeNB 110 to wake the UE 100 up. The UE wake-up request may be referred to as a UE_WAKEUP_REQ.

The SeNB 120 may determine the time to transmit the UE_WAKEUP_REQ, based on at least one of a Xn delay, a time at which the SeNB 120 has received a first data packet in a long DRX cycle of the MeNB 110 from the core network, and a start time of a following long DRX cycle of the MeNB 110.

In some embodiments, when a time difference between the time at which the SeNB 120 has received the first data packet in the long DRX cycle of the MeNB 110 from the core network and the start time of the following long DRX cycle of the MeNB 110 is larger than the Xn delay, the SeNB 120 transmits the UE_WAKEUP_REQ, to the MeNB 110, in an approaching long DRX cycle of the MeNB 110. However, when the time difference between the time at which the SeNB 120 has received the first data packet in the long DRX cycle of the MeNB 110 from the core network and the start time of the following long DRX cycle of the MeNB 110 is not larger than the Xn delay, the SeNB 120 transmits the UE_WAKEUP_REQ, to the MeNB 110, in a following long DRX cycle of the approaching long DRX cycle of the MeNB 110.

In step S615, the MeNB 110 determines the time to indicate to the UE 100 to monitor the SeNB 120. Herein, the MeNB 110 may determine the time to indicate the UE 100 to monitor the SeNB 120, based on information included in the UE_WAKEUP_REQ.

In step S620, the MeNB 110 transmits an SeNB monitoring indication to the UE 100. Herein, the indication may be transmitted at the time determined in step S615. For example, step S220 may include step S150, as illustrated in FIG. 6, and the MeNB 110 may transmit an indication 1330, as illustrated in FIG. 14.

In some embodiments, without performing step S615, in response to a reception of the UE_WAKEUP_REQ, the MeNB 110 may notify the UE 100 that the SeNB 120 is to be monitored on an approaching DRX activity duration, at a time when the UE_WAKEUP_REQ has been received.

In step S625, the UE 100 starts to monitor the SeNB 120. For example, the UE 100 may monitor the SeNB 120, based on the DRX configuration of the SeNB 120, which is received in step S140, as illustrated in FIG. 6.

The UE 100 monitors a short DRX activity duration. For example, step S625 may include step S160, as illustrated in FIG. 6.

In step S630, the SeNB 120 transmits, to the UE 100 the data received in step S605. Herein, the SeNB 120 transmits data on a short DRX activity duration and the UE 100 receives the data based on a DRX configuration of the SeNB 120. That is, the UE 100 receives data from the SeNB 120 on the short DRX activity duration. For example, step S230 may include step S170, as illustrated in FIG. 6.

In step S635, the SeNB 120 identifies whether there is remaining data to be transmitted.

When there is remaining data to be transmitted, the SeNB 120 transmits the UE_WAKEUP_REQ to the MeNB 110 in step S640.

In response to the indicator reception, the MeNB 110 re-performs step S615 to S625 and transmits the remaining data to the UE 100.

While the present invention has been particularly shown and described with reference to certain embodiments thereof, it will be understood by those of ordinary skill in the art that various changes in form and details may be made therein without departing from the spirit and scope of the present invention as defined by the following claims and their equivalents.

What is claimed is:

1. A method by a first base station in a wireless communication system, the method comprising:
receiving, from a second base station or a core network, information of data to be transmitted to a terminal through the second base station;
determining a monitoring condition for the terminal to monitor the second base station based on the information of the data; and
transmitting, to the terminal, a monitoring request message during a first discontinuous reception (DRX) activity time of a first DRX configuration of the first base station, wherein the monitoring request message requests the terminal to monitor a second DRX activity time of a second DRX configuration of the second base station based on the monitoring condition,
wherein the monitoring condition includes a number of times that the terminal is to monitor the second DRX activity time of the second DRX configuration of the second base station.

2. The method of claim 1, wherein the monitoring condition further includes a duration for the terminal to monitor the second DRX activity time of the second DRX configuration of the second base station, and
wherein the monitoring request message includes the second DRX configuration of the second base station.

3. The method of claim 1, further comprising determining the first DRX activity time of the first DRX configuration of the first base station for transmitting the monitoring request message to the terminal based on at least one of a backhaul transmission delay between the first base station and the second base station, a time at which the data is transmitted to the second base station, and a start time of the second DRX activity time of the second DRX configuration of the second base station.

4. The method of claim 1, wherein the information of the data includes at least one of a size of the data, and information indicating whether data to be transmitted remains.

5. The method of claim 1, further comprising transmitting, to the second base station, information of the monitoring condition.

6. A method by a terminal in a wireless communication system, the method comprising:
receiving, from a first base station, a monitoring request message during a first discontinuous reception (DRX) activity time of a first DRX configuration of the first base station, wherein the monitoring request message requests the terminal to monitor a second DRX activity time of a second DRX configuration of a second base station, the monitoring request message includes a monitoring condition for the terminal to monitor the second DRX activity time of the second DRX configuration of the second base station, and the monitoring condition includes a number of times that the terminal is to monitor the second DRX activity time of the second DRX configuration of the second base station; and
monitoring the second DRX activity time of the second DRX configuration of the second base station based on the monitoring condition including the number of times that the terminal is to monitor the second DRX activity time of the second DRX configuration of the second base station.

7. The method of claim 6, wherein the monitoring request message further includes the second DRX configuration of the second base station, and
wherein the monitoring condition further includes a duration for the terminal to monitor the second DRX activity time of the second DRX configuration of the second base station.

8. The method of claim 6, wherein the first DRX activity time of the first DRX configuration of the first base station is determined based on at least one of a backhaul transmission delay between the first base station and the second base station, a time at which the data is transmitted to the second base station, and a start time of the second DRX activity time of the second DRX configuration of the second base station.

9. A method by a first base station in a wireless communication system, the method comprising:
determining a first discontinuous reception (DRX) configuration of the first base station;
receiving, from a second base station, information of monitoring condition for a terminal to monitor a first DRX activity time of the first DRX configuration of the first base station, the monitoring condition being determined based on information of data to be transmitted to the terminal through the first base station; and
transmitting, to the terminal, the data during the first DRX activity time of the first DRX configuration of the first base station based on the monitoring condition and the first DRX,
wherein the monitoring condition includes a number of times that the terminal is to monitor the first DRX activity time of the first DRX configuration of the first base station, and
wherein the monitoring condition is transmitted to the terminal by the second base station during a second DRX activity time of a second DRX configuration of the second base station.

10. The method of claim 9, wherein the monitoring condition further includes a duration for the terminal to monitor the first DRX activity time of the first DRX configuration of the first base station, and
wherein the second DRX activity time of the second DRX configuration of the second base station is determined based on at least one of a backhaul transmission delay between the first base station and the second base station, a time at which the data is received by the first base station, and a start time of the first DRX activity time of the first DRX configuration of the first base station.

11. A base station in a wireless communication system, the base station comprising:
a transceiver; and
a controller configured to:
control the transceiver to receive, from another base station or a core network, information of data to be transmitted to a terminal through the another base station, determine a monitoring condition for the terminal to monitor the another base station based on the information of data, and control the transceiver to transmit, to the terminal, a monitoring request message during a first discontinuous reception (DRX) activity time of a first DRX configuration of the base station, wherein the monitoring request message requests the terminal to monitor a second DRX activity time of a second DRX configuration of the another base station based on the monitoring condition, and wherein the monitoring condition includes a number of times that the terminal is to monitor the second DRX activity time of the second DRX configuration of the another base station.

12. The base station of claim 11, wherein the monitoring condition further includes a duration for the terminal to monitor the another base station, and wherein the monitoring request message includes the second DRX configuration of the another base station.

13. The base station of claim 11, wherein the controller is further configured to determine the first DRX activity time of the first DRX configuration of the base station for transmitting the monitoring request message to the terminal based on at least one of a backhaul transmission delay between the base station and the another base station, a time at which the data is transmitted to the another base station, and a start time of the second DRX activity time of the second DRX configuration of the another base station.

14. The method of claim 11, wherein the information of the data includes at least one of a size of the data, and information indicating whether data to be transmitted remains.

15. The base station of claim 11, wherein the controller is further configured to transmit, to the another base station, information of the monitoring condition.

16. A terminal in a wireless communication system, the terminal comprising:

a transceiver; and a controller configured to:

control the transceiver to receive, from a first base station, a monitoring request message during a first discontinuous reception (DRX) activity time of a first DRX configuration of the first base station, wherein the monitoring request message requests the terminal to monitor a second DRX activity time of a second DRX configuration of a second base station, the monitoring request message includes a monitoring condition for the terminal to monitor the second DRX activity time of the second DRX configuration of the second base station, and the monitoring condition includes a number of times that the terminal is to monitor the second DRX activity time of the second DRX configuration of the second base station, and monitor the second DRX activity time of the second DRX configuration of the second base station based on the monitoring condition including the number of times that the terminal is to monitor the second DRX activity time of the second DRX configuration of the second base station.

17. The terminal of claim 16, wherein the monitoring request message further includes the second DRX configuration of the second base station, and wherein the monitoring condition further includes a duration for the terminal to monitor the second DRX activity time of the second DRX configuration of the second base station.

18. The terminal of claim 16, wherein the first DRX activity time of the first DRX configuration of the first base station is determined based on at least one of a backhaul transmission delay between the first base station and the second base station, a time at which the data is transmitted to the second base station, and a start time of the second DRX activity time of the second DRX configuration of the second base station.

19. A base station in a wireless communication system, the base station comprising:

a transceiver; and a controller configured to:

determine a first discontinuous reception (DRX) configuration of the base station, control the transceiver to receive, from a another base station, information of monitoring condition for a terminal to monitor a first DRX activity time of the first DRX configuration of the base station, the monitoring condition being determined based on information of data to be transmitted to the terminal through the base station, and control the transceiver to transmit, to the terminal, the data during the first DRX activity time of the first DRX configuration of the base station based on the monitoring condition and the first DRX configuration, wherein the monitoring condition includes a number of times that the terminal is to monitor the first DRX activity time of the first DRX configuration of the first base station, and wherein the monitoring condition is transmitted to the terminal by the another base station during a second DRX activity time of a second DRX configuration of the another base station.

20. The base station of claim 19, wherein the monitoring condition further includes a duration for the terminal to monitor the first DRX activity time of the first DRX configuration of the base station, and wherein the second DRX activity time of the second DRX configuration of the another base station is determined based on at least one of a backhaul transmission delay between the base station and the another base station, a time at which the data is received by the base station, and a start time of the first DRX activity time of the first DRX configuration of the base station.

* * * * *